United States Patent
Ito

(10) Patent No.: US 7,051,228 B2
(45) Date of Patent: May 23, 2006

(54) DATA TRANSMISSION SYSTEM USING EQUALIZED DATA STREAMS INDICATIVE OF LENGTHS OF TIME

(75) Inventor: Hirosumi Ito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 613 days.

(21) Appl. No.: 10/115,911

(22) Filed: Apr. 5, 2002

(65) Prior Publication Data

US 2002/0145638 A1 Oct. 10, 2002

(30) Foreign Application Priority Data

Apr. 5, 2001 (JP) ............................. 2001-107619
Apr. 26, 2001 (JP) ............................. 2001-130248

(51) Int. Cl.
*G06F 1/04* (2006.01)
(52) U.S. Cl. ..................................... 713/600
(58) Field of Classification Search ............... 713/600; 375/238

See application file for complete search history.

(56) References Cited

U.S. PATENT DOCUMENTS

| 5,150,951 A | * | 9/1992 | Leiber et al. ............... 303/186 |
| 5,480,373 A | * | 1/1996 | Fischer et al. ............... 600/14 |
| 5,671,373 A | * | 9/1997 | Prouty et al. ............... 710/307 |

* cited by examiner

*Primary Examiner*—Lynne H. Browne
*Assistant Examiner*—Anand B. Patel
(74) *Attorney, Agent, or Firm*—Oliff & Berridge, PLC

(57) ABSTRACT

In the data transmission system 1 for transmitting drive pulse data from a personal computer to an ink jet printer in 8-bit units, the drive pulse data includes 7 bits of pulse width data Hx and 9 bits of pulse interval data Lx. The personal computer reduces pulse interval data, which has an amount of data exceeding 8 bits, in half by shifting the bits one place to the right before transmitting the data to the inkjet printer. The basic time period used for decoding the pulse interval data is set to twice the basic time period used for decoding the pulse width data. The pulse interval data is decoded based on this larger basic time period.

38 Claims, 11 Drawing Sheets

```
PULSE WIDTH DATA    : Hx = (hx6, hx5, hx4, hx3, hx2, hx1, hx0)          : 7BIT
PULSE INTERVAL DATA : Lx = (lx8, lx7, lx6, lx5, lx4, lx3, lx2, lx1, lx0) : 9BIT
BASIC TIME PERIOD   : a
```

FIG.2

| ADDRESS | MSB | | | | | | | LSB |
|---|---|---|---|---|---|---|---|---|
| 0007H | | | | | | | | |
| 0006H | 0 | h26 | h25 | h24 | h23 | h22 | h21 | h20 |
| 0005H | 0 | 0 | 0 | 0 | 0 | 0 | 0 | 118 |
| 0004H | 117 | 116 | 115 | 114 | 113 | 112 | 111 | 110 |
| 0003H | 0 | h16 | h15 | h14 | h13 | h12 | h11 | h10 |
| 0002H | 0 | 0 | 0 | 0 | 0 | 0 | 0 | 108 |
| 0001H | 107 | 106 | 105 | 104 | 103 | 102 | 101 | 100 |
| 0000H | 0 | h06 | h05 | h04 | h03 | h02 | h01 | h00 |

PULSE WIDTH DATA : Hx = (hx6, hx5, hx4, hx3, hx2, hx1, hx0) : 7BIT
PULSE INTERVAL DATA : Lx = (lx8, lx7, lx6, lx5, lx4, lx3, lx2, lx1, lx0) : 9BIT

FIG.6

| ADDRESS | MSB | | | | | | | LSB |
|---|---|---|---|---|---|---|---|---|
| 0007H | | | | | | | | |
| 0006H | | | | | | | | |
| 0005H | | | | | | | | |
| 0004H | 0 | h26 | h25 | h24 | h23 | h22 | h21 | h20 |
| 0003H | l18 | l17 | l16 | l15 | l14 | l13 | l12 | l11 |
| 0002H | 0 | h16 | h15 | h14 | h13 | h12 | h11 | h10 |
| 0001H | l08 | l07 | l06 | l05 | l04 | l03 | l02 | l01 |
| 0000H | 0 | h06 | h05 | h04 | h03 | h02 | h01 | h00 |

PULSE WIDTH DATA : $Hx = (hx6, hx5, hx4, hx3, hx2, hx1, hx0)$ : 7BIT
PULSE INTERVAL DATA : $Lx = (lx8, lx7, lx6, lx5, lx4, lx3, lx2, lx1)$ : 8BIT

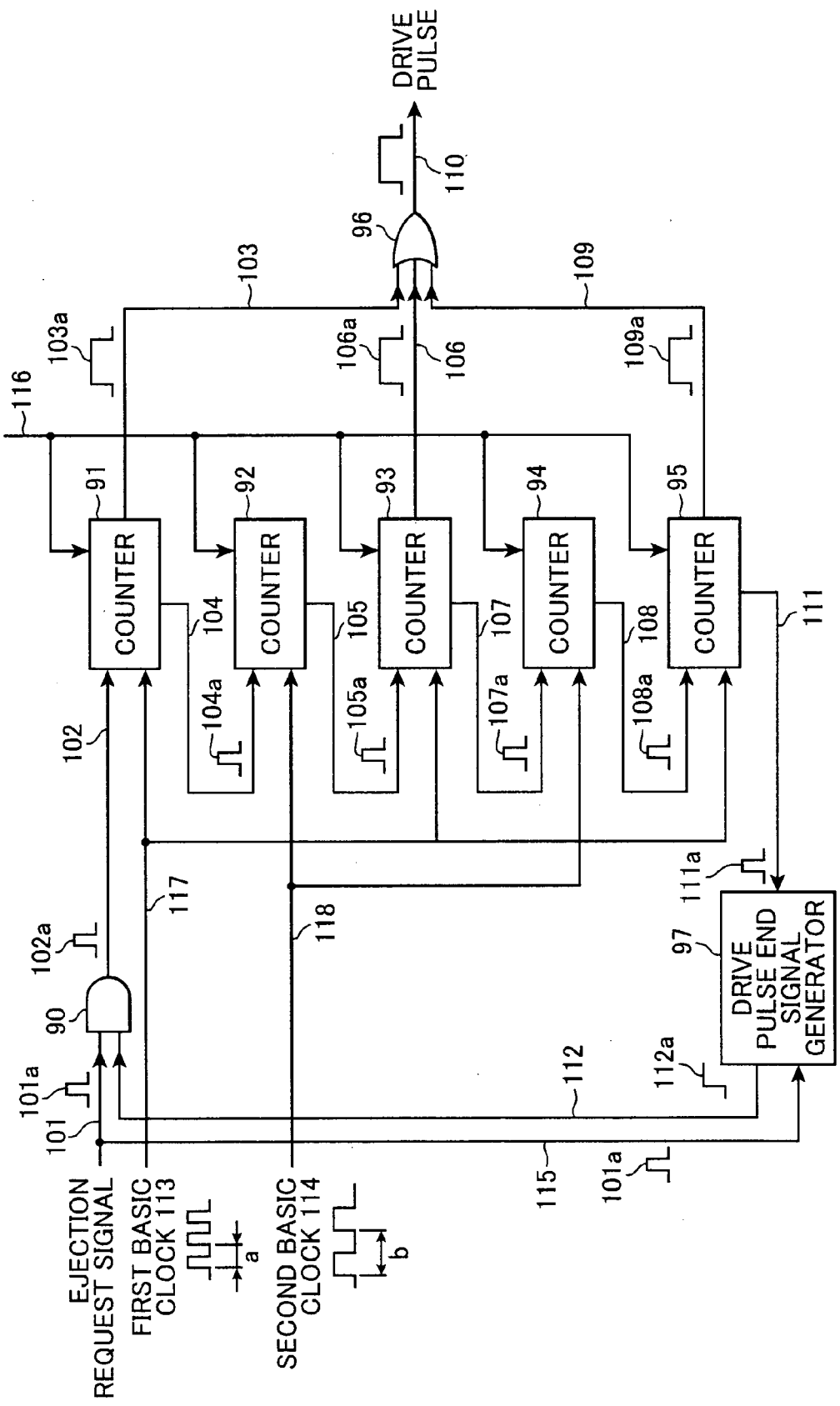

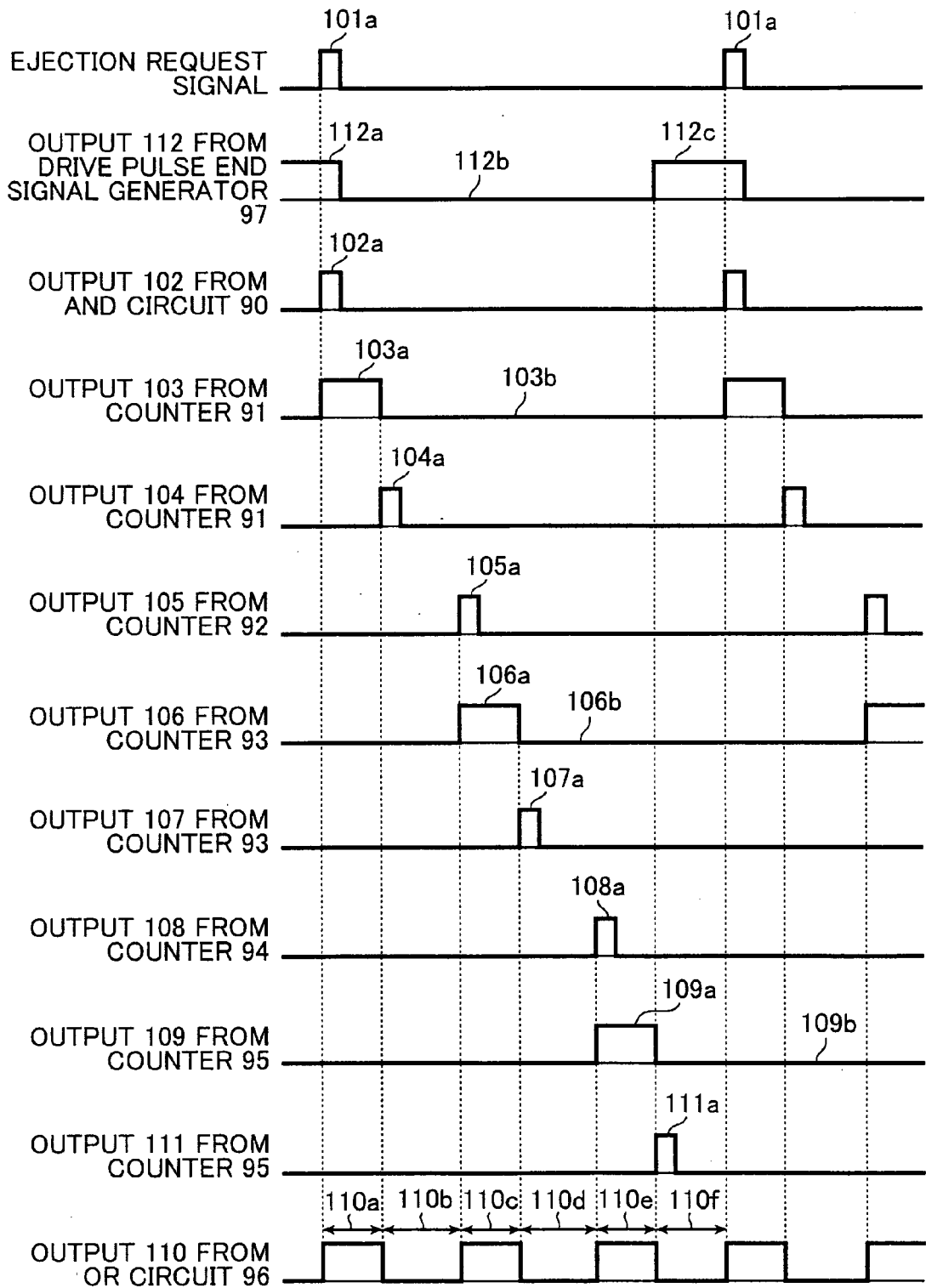

```
PULSE WIDTH DATA:    Hx = (hx6, hx5, hx4, hx3, hx2, hx1, hx0)      : 7BIT
PULSE INTERVAL DATA: Lx = (lx8, lx7, lx6, lx5, lx4, lx3, lx2, lx1) : 8BIT
FIRST BASIC TIME PERIOD:  a
SECOND BASIC TIME PERIOD: b = 2a
```

| ADDRESS | MSB | | | | | | | LSB |
|---|---|---|---|---|---|---|---|---|
| 0007H | | | | | | | | |
| 0006H | | | | | | | | |
| 0005H | | | | | | | | |
| 0004H | 128 | h26 | h25 | h24 | h23 | h22 | h21 | h20 |
| 0003H | 117 | 116 | 115 | 114 | 113 | 112 | 111 | 110 |
| 0002H | 118 | h16 | h15 | h14 | h13 | h12 | h11 | h10 |
| 0001H | 107 | 106 | 105 | 104 | 103 | 102 | 101 | 100 |
| 0000H | 108 | h06 | h05 | h04 | h03 | h02 | h01 | h00 |

Hx = (hx6, hx5, hx4, hx3, hx2, hx1, hx0) : 7BIT
Lx = (lx8, lx7, lx6, lx5, lx4, lx3, lx2, lx1, lx0) : 9BIT

DATA TRANSMISSION SYSTEM USING EQUALIZED DATA STREAMS INDICATIVE OF LENGTHS OF TIME

BACKGROUND OF THE INVENTION

1. Field of the Invention

The present invention relates to a data transmission system.

2. Description of Related Art

There has been proposed a data transmission system including a personal computer as a transmission device and an ink jet printer with a plurality of nozzles as the reception device. Print data created on the personal computer is transmitted to the ink jet printer. The ink jet printer performs a printing process based on the received print data.

In recent years, there has been a demand for ink jet printers to eject smaller ink droplets via their nozzles in order to print images of higher resolution. To achieve this, there has been an increased popularity of printers capable of expressing color tones of a high resolution through a "multi-pulse" driving method. In this method, a plurality of pulses is applied to a piezoelectric element in the print head. A plurality of ink droplets is ejected to form a single dot of an image. Printing control software called a printer driver is incorporated in the operating system of the personal computer, such as Windows (trade mark). Drive pulse data for driving the print head is generated by the printer driver based on the print data and transmitted to the ink jet printer to perform the printing operation. The transferred drive pulse data is stored in the memory of the ink jet printer. The pulse data is used by a gate array (G/A) to generate a drive pulse for driving the print head according to a basic clock signal having a predetermined basic time period.

SUMMARY OF THE INVENTION

Next will be described a conceivable data transmission system, in which a personal computer is connected to an ink jet printer of the "multi-pulse" driving type. It is now assumed that the gate array (G/A) in the ink jet printer uses a basic clock signal having a predetermined period of time "a" as shown in FIG. 1(b). It is also assumed that in order to print a dot of image, the print head of the ink jet printer has to be supplied with a series of drive pulses that includes three successive pulses as shown in FIG. 1(a). In the drive pulse series, the widths T0, T2, and T4 of the respective drive pulses are defined as "a×H0", "a×H1", and "a×H2", and the lengths T1 and T3 of the respective intervals are defined as "a×L0" and "a×L1". In such a case, the personal computer has to transmit pulse width data "H0", pulse interval data "L0", pulse width data "H1", pulse interval data "L1", and pulse width data "R2" to the ink jet printer. Receiving those pulse width data "Hx" (where x=0, 1, and 2) and pulse interval data "Lx" (where x=0, and 1), the gate array (G/A) in the ink jet printer creates the drive pulses of FIG. 1(a) by using the basic clock signal having the basic time period "a".

For example, in order to control the gate array to generate drive pulses with a pulse width of 8 μs and a pulse interval of 30 μs, based on a basic clock signal having the basic time period of 0.1 μs, the personal computer has to transmit pulse width data Hx of 8/0.1=80 (110000B), or 7 bits of data, and pulse interval data Lx of 30/0.1=300 (100101100B), or 9 bits of data.

Accordingly, in this example, the personal computer transmits drive pulse data formed of a 7-bit pulse width data Hx=(hx6, hx5, hx4, hx3, hx2, hx1, hx0) (where x=0, 1, and 2) and a 9-bit pulse interval data Lx=(lx8, lx7, lx6, lx5, lx4, lx3, lx2, lx1, lx0) (where x=0, and 1). Since data is ordinarily processed in 1-byte (8-bit) units, the personal computer transfers the data to the ink jet printer in 8-bit units and the transmitted data is written to the memory of the ink jet printer in 8-bit units.

In this conceivable example, the ink jet printer receives and stores, in its memory, the drive pulse data Hx=(hx6, hx5, hx4, hx3, hx2, hx1, hx0) and Lx=(lx8, lx7, lx6, lx5, lx4, lx3, lx2, lx1, lx0) as shown in FIG. 2.

More specifically, the personal computer first transmits, to the ink jet printer, an 8-bit unit formed of the 7-bit pulse width data H0=(h06, h05, h04, h03, h02, h01, h00) and one free bit. This one byte of data is stored at the address 0000H in the memory of the ink jet printer. The personal computer divides the 9-bit pulse interval data L0=(l08, l07, l06, l05, l04, l03, l02, l01, l00) into: a first pulse interval data including the 8-bit data (l07, l06, l05, l04, l03, l02, l01, l00) and a second pulse interval data including the remaining one bit pulse interval data (l08) and seven free bits. The personal computer transmits the first and second pulse interval data to the ink jet printer These two sets of pulse interval data are stored as two bytes of data at the addresses 0001H and 0002H in the memory of the ink jet printer.

It is noted that the print head of this conceivable ink jet printer is controlled to form one dot of an image by a drive pulse consisting of three pulse widths (high pulses) and two pulse intervals (low pulses). Hence, three bytes of pulse width data H0, H1, and H2 are stored at addresses 0000H, 0003H, and 0006H in the image memory, and four bytes of pulse interval data L0 and L1 are stored at addresses 0001H–0002H and 0004H–0005H in the image memory.

The gate array (G/A) provided in the ink jet printer forms a successive print pulses for driving the print head, as shown in FIG. 1(a), based on the pulse width data and the pulse interval data stored in the memory as shown in FIG. 2 and based an the basic clock signal having the predetermined basic time period "a". This series of drive pulses are applied to the piezoelectric element in the print head via the head driver. When the drive pulses are applied to a corresponding piezoelectric element in the print head, the piezoelectric element contracts, changing the volume in the corresponding ink chamber of the print head. Ink accumulated in the ink chamber is ejected as ink droplets from its corresponding nozzle in response to the changes in volume. In this way the printing operation is performed.

However, by dividing the 9-bit pulse interval data into a first pulse interval data and a second pulse interval data when transmitting this data to the ink jet printer, as described above, the personal computer has to essentially transmit sixteen bits (two bytes) of data in order to transmit the 9-bit pulse interval data. Hence a long time is required to transmit the entire data from the personal computer to the ink jet printer.

Further, since the transmitted data occupies sixteen bits (two bytes) of memory in the ink jet printer, the printer requires a large capacity of memory, thereby increasing the manufacturing costs of the ink jet printer.

In view of the above-described drawbacks, it is an object of the present invention to provide an improved data transmission system that is capable of decreasing the time required to transmit data from a transmission device to a reception device and that is capable of decreasing the volume of memory expended in the reception device.

In order to attain the above and other objects, the present invention provides a data transmission system, comprising:

a transmission device, including: a converting unit receiving two sets of pulse/interval data indicative of two lengths, the two sets of pulse/interval data including one set of pulse width data indicative of a length of one pulse width and one set of pulse interval data indicative of a length of one pulse interval, the converting unit converting the two sets of pulse/interval data into two sets of successive data segments, each data segment including data of a predetermined amount; and a transmission unit transmitting the two data segments, each data segment containing data of the predetermined amount; and a reception device receiving the two data segments from the transmission device and processing the data segments.

In this way, when the transmission device and the reception device process data in data units of the predetermined amount and when the transmission device has to transmit one set of pulse width data and one set of pulse interval data, the converting unit converts the one set of pulse width data and one set of pulse interval data into two successive data units, thereby reducing the total amount of data transmitted. Accordingly, it is possible to efficiently transmit data to the reception device and to shorten the time required for transmission. Further, because the reception device receives only two data segments, the memory of the reception device is efficiently used, thereby requiring a smaller capacity memory. Hence, it is possible to reduce the manufacturing costs of the reception device.

When either one of the pulse width data and the pulse interval data is an amount-exceeding pulse/interval data set, which contains data of an amount exceeding the predetermined amount, and the other one of the pulse width data and the pulse interval data is an amount-smaller pulse/interval data, which contains data of an amount smaller than the predetermined amount, the converting unit preferably includes an embedding unit that produces one data segment based on a portion of one amount-exceeding pulse/interval data set, the embedding unit producing another data segment based on the entire portion of one amount-smaller pulse/interval data set, the embedding unit embedding a remaining portion of the amount-exceeding pulse/interval data set in an unused portion of the other data segment that includes the amount-smaller pulse/interval data set, thereby producing the two successive data segments.

With this construction, the embedding unit embeds a portion of the pulse width data or the pulse interval data that exceeds the predetermined amount in the unused portion of another segment that contains the other data, thereby converting the pulse width data and the pulse interval data into only two successive segments. It is possible to reduce the total amount of data transmitted. The thus produced two successive data segments are transmitted to the reception device.

Hence, the transmission device can transmit the portion of data exceeding the predetermined amount for one segment together with other data in a single segment having free space. Accordingly, the transmission device can efficiently transmit data to the reception device and can decrease the time required to transmit this data from the transmission device to the reception device. Further, because the reception device can receive data converted by the converting unit, the memory of the reception device is efficiently used, thereby requiring a smaller capacity memory. Hence, it is possible to reduce the manufacturing costs of the reception device.

When each pulse/interval data set indicates the corresponding length based on a predetermined first basic period of time, the converting unit preferably includes a reducing unit reducing the amount of an amount-exceeding pulse/interval data set, which contains data of an amount exceeding the predetermined amount, to produce one data segment of the predetermined amount, the reducing unit failing to reduce the data amount of an amount-non-exceeding pulse/interval data set, which contains data of an amount smaller than or equal to the predetermined amount, to produce another data segment of the predetermined amount. In this case, the reception device preferably includes a decoding unit decoding the data segment for the amount-non-exceeding pulse/interval data set based on the first basic period of time, thereby recovering the length indicated by the amount-non-exceeding pulse/interval data, the decoding unit decoding the data segment for the amount-exceeding pulse/interval data set based on the second basic period of time, thereby recovering the length indicated by the amount-exceeding pulse/interval data. It is noted that each of the pulse width data and the pulse interval data is either one of the amount-exceeding pulse/interval data set and the amount-non-exceeding pulse/interval data set, the second basic period of time being longer than the first basic period of time by a length that corresponds to the data amount, by which the reducing unit has reduced from the original data amount of the amount-exceeding pulse/interval data set into the predetermined amount.

With this construction, when the transmission device transmits pulse width data or pulse interval data exceeding the predetermined amount of data to the reception device, the transmission device reduces the amount of the pulse width data or pulse interval data exceeding the predetermined amount into an amount not exceeding the predetermined amount. When the transmission device transmits pulse width data or pulse interval data not exceeding the predetermined amount of data to the reception device, the transmission device does not reduce the amount of the pulse width data or pulse interval data not exceeding the predetermined amount.

In this case, the reception device decodes the data-amount non-reduced data based on the first basic time period. It is noted that the data-amount non-reduced data properly indicates the value that is equal to the original value indicated by the original data. The reception device therefore recovers the original value by decoding the data-amount reduced data by the first basic time period. On the other hand, the reception device decodes the data-amount reduced data based on the second basic time period which is longer than the first basic time period. It is noted that the data-amount reduced data indicates a value smaller than the original value indicated by the original data. Accordingly, the reception device recovers the original value by decoding the data-amount reduced data by the second basic time period that is longer than the first basic time period by an amount corresponding to the reduced data amount. Accordingly, it is possible to properly recover the original values of both of the data amount non-reduced data and the data amount reduced data.

According to another aspect, the present invention provides a data transmission system, comprising: a transmission device transmitting pulse-series information indicating a series of pulses, the series of pulses including a plurality of pulses which are separated from one another by at least one interval, the pulse-series information including: a plurality of sets of pulse width data indicating pulse width of the plurality of pulses, and at least one pulse interval data indicating length of the at least one interval, the transmission device including: a converting unit receiving one set of pulse width data, indicative of one pulse, and one set of pulse interval data, indicative of one interval following or preceding the one pulse, either one of the pulse width data and the pulse interval data having data of an amount greater than a predetermined amount and the other one of the pulse width data and the pulse interval data having data of an amount smaller than the predetermined amount, the converting unit converting the one set of pulse width data and the one set of pulse interval data into successive data segments, each data segment including data of the predetermined amount, the converting unit performing the conversion operation by embedding a portion of the either one of the pulse width data and the pulse interval data, whose data amount exceeds the predetermined amount of one data segment, in an unused portion of another data segment that includes the other one of the pulse width data and the pulse interval data, thereby producing the successive data segments; and a transmission unit transmitting the data segments, each data segment containing data of the predetermined amount; and a reception device receiving the data segments from the transmission device and processing the data segments.

In this way, when the transmission device and the reception device process data in data units of the predetermined amount and when the transmission device has to transmit one set of pulse width data and one set of pulse interval data, the converting unit converts the one set of pulse width data and one set of pulse interval data into successive data units, by embedding a portion of the pulse width data or the pulse interval data that exceeds the predetermined amount of one segment in the unused portion of another segment that includes the other data. It is possible to reduce the total amount of data transmitted.

Hence, the transmission device can transmit the portion of data exceeding the predetermined amount for one segment together with other data in a single segment having free space. Accordingly, the transmission device can efficiently transmit data to the reception device and can decrease the time required to transmit this data from the transmission device to the reception device. Further, because the reception device can receive data converted by the converting unit, the memory of the reception device is efficiently used, thereby requiring a smaller capacity memory. Hence, it is possible to reduce the manufacturing costs of the reception device, According to another aspect, the present invention provides a data transmission system, comprising: a transmission device transmitting pulse-series information indicating a series of pulses, the series of pulses including a plurality of pulses which are separated from one another by at least one interval, the pulse-series information including: a plurality of sets of pulse width data indicating pulse width of the plurality of pulses based on a predetermined first basic period of time, and at least one pulse interval data indicating length of the at least one interval based on the predetermined first basic period of time, the transmission device including: a converting unit receiving one set of pulse width data, indicative of one pulse, and one set of pulse interval data, indicative of one interval following or preceding the one pulse, the converting unit converting the one set of pulse width data and the one set of pulse interval data into successive data segments, each data segment including data of the predetermined amount, the converting unit including a reducing unit reducing, when one of the pulse width data and the pulse interval data contains data of a data amount exceeding the predetermined amount, the data amount of the one of the pulse width data and the pulse interval data into a data amount, which is equal to or smaller than the predetermined amount and which corresponds to a second basic period of time longer than the first basic period of time; and a transmission unit transmitting the data segments; and a reception device receiving the data segments from the transmission device and processing the data segments, the reception device including a decoding unit decoding one data segment by using the first basic period of time, when the one data segment is for one of the pulse width data and the pulse interval data, whose data amount has been smaller than or equal to the predetermined amount, the decoding unit decoding one data segment by using the second basic period of time, when the one data segment is for one of the pulse width data and the pulse interval data, whose data amount has been reduced by the reducing unit.

In this way, according to the data transmission system of the present invention, when one set of data (pulse width data or pulse interval data) for transmission contains data of an amount exceeding the predetermined amount, it is possible to reduce the amount of data and to transmit the amount-reduced data by increasing the length of the basic time period to be used during the decoding operation at the receiving side. Therefore, the transmission device can transmit the amount-exceeding data after reducing the amount of the data to the predetermined amount.

According to another aspect, the present invention provides a data transmission system, comprising: a transmission device, including: a converting unit receiving a first set of data and a second set of data, the first set of data having data of an amount greater than a predetermined amount and the second set of data having data of an amount smaller than the predetermined amount, the converting unit producing a first data segment that includes a portion of the first set of data, the converting unit producing a second data segment that includes the second set of data and embedding a remaining portion of the first set of data in an unused portion of the second data segment, thereby converting the first and second sets of data into the first and second data segments, each of the first and second data segments including data of the predetermined amount; and a transmission unit transmitting the first and second data segments; and a reception device receiving the first and second data segments from the transmission device and processing the first and second data segments.

In this way, when the transmission device and the reception device process data in data units of the predetermined amount and when the transmission device has to transmit the first and second sets of data, the converting unit converts the first and second sets of data into successive data units, by embedding a portion of the first set of data in the unused portion of another segment that includes the second set of data. It is possible to reduce the total amount of data transmitted.

According to another aspect, the present invention provides a data transmission system, comprising: a transmission device, including: a converting unit receiving a set of data indicative of a time length based on a predetermined first basic period of time, the converting unit converting the set of data into a data segment of a predetermined amount, the converting unit converting the data set into the data segment by reducing the data amount of the set of data into an amount smaller than or equal to the predetermined amount when the set of data contains data of an amount greater than the predetermined amount; and a transmission unit transmitting the data segment; and a reception device receiving the data segment from the transmission device, the reception device including a decoding unit, the decoding unit decoding, when the converting unit has converted the original data set into the data segment without reducing the data amount, the data segment by using the first basic period of time, to produce data indicative of the original time length, the decoding unit decoding, when the converting unit has converted the original data set into the data segment while reducing the data amount, the data segment by using a second basic period of time, to produce data indicative of the original time length, the second basic period of time being longer than the first basic period of time by a length that corresponds to the data amount, by which the converting unit has reduced from the original data amount of the data set.

In this way, according to the present invention, the reception device decodes the amount-reduced data by using the second basic time period that is longer than the first basic time period used for decoding data of the predetermined amount. Accordingly, even if the original data amount exceeds the predetermined amount, the transmission device can reduce the amount of data to an amount equal to or smaller than the predetermined amount that corresponds to the first basic time period.

According to another aspect, the present invention provides a program for a data transmission system, the data transmission system including a transmission device transmitting pulse-series information, indicating a series of pulses, in the form of data segments, and a reception device receiving the data segments from the transmission device and processing the data segments, the series of pulses including a plurality of pulses which are separated from one another by at least one interval, the pulse-series information including: a plurality of sets of pulse width data indicating pulse width of the plurality of pulses, and at least one pulse interval data indicating length of the at least one interval, the program including: a converting program receiving one set of pulse width data, indicative of one pulse, and one set of pulse interval data, indicative of one interval following or preceding the one pulse, either one of the pulse width data and the pulse interval data having data of an amount greater than a predetermined amount and the other one of the pulse width data and the pulse interval data having data of an amount smaller than the predetermined amount, the converting program converting the one set of pulse width data and the one set of pulse interval data into successive data segments, each data segment including data of the predetermined amount, the converting program performing the conversion operation by embedding a portion of the either one of the pulse width data and the pulse interval data, whose data amount exceeds the predetermined amount of one data segment, in an unused portion of another data segment that includes the other one of the pulse width data and the pulse interval data, thereby producing the successive data segments; and a transmission program transmitting the data segments, each data segment containing data of the predetermined amount.

This program may be stored in a program storage medium, which is capable of being read by a computer and which is for the data transmission system.

According to another aspect, the present invention provides a program for a data transmission system, the data transmission system including a transmission device transmitting pulse-series information, indicating a series of pulses, in the form of data segments, and a reception device receiving the data segments from the transmission device and processing the data segments, the series of pulses including a plurality of pulses which are separated from one another by at least one interval, the pulse-series information including: a plurality of sets of pulse width data indicating pulse width of the plurality of pulses based on a predetermined first basic period of time, and at least one pulse interval data indicating length of the at least one interval based on the predetermined first basic period of time, the program including: a converting program receiving one set of pulse width data, indicative of one pulse, and one set of pulse interval data, indicative of one interval following or preceding the one pulse, the converting program converting the one set of pulse width data and the one set of pulse interval data into successive data segments, each data segment including data of the predetermined amount, the converting program including a reducing program reducing, when one of the pulse width data and the pulse interval data contains data of a data amount exceeding the predetermined amount, the data amount of the one of the pulse width data and the pulse interval data into a data amount, which is equal to or smaller than the predetermined amount and which corresponds to a second basic period of time longer than the first basic period of time; and a transmission program transmitting the data segments.

The program may be stored in a program storage medium, which is capable of being read by a computer and which is for the data transmission system.

BRIEF DESCRIPTION OF THE DRAWINGS

The above and other objects, features and advantages of the invention will become more apparent from reading the following description of the preferred embodiments taken in connection with the accompanying drawings in which:

FIG. 2 is a diagram showing how drive pulse data indicative of the drive pulses in FIG. 1(a) is stored in the memory of the conceivable ink jet printer;

FIG. 6 is a diagram showing how drive pulse data transmitted from the personal computer by the process of FIG. 5 is stored in the memory of the ink jet printer according to the first embodiment;

FIG. 7 is a block diagram showing the circuitry of a gate array provided in the ink jet printer according to the second embodiment;

FIG. 8 is a timing chart for the drive pulses outputted from the gate array according to the second embodiment;

FIG. 11(*b*) is an explanatory diagram showing the drive pulses formed based on the drive pulse data shown in FIG. 11(*a*).

DETAILED DESCRIPTION OF THE PREFERRED EMBODIMENTS

Figure 1A:
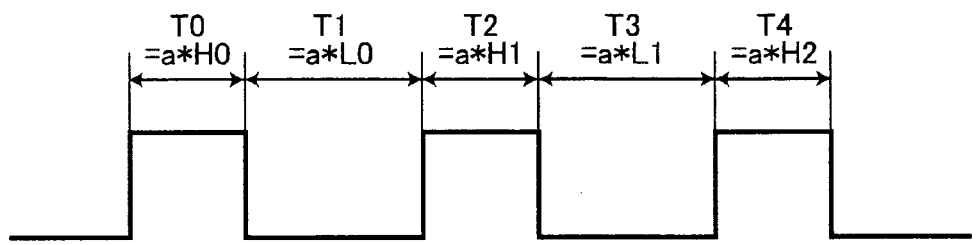
FIG. 1(a) is a timing chart of a series of drive pulses used in a conceivable ink jet printer.

A data transmission system according to preferred embodiments of the present invention will be described while referring to the accompanying drawings wherein like parts and components are designated by the same reference numerals to avoid duplicating description.

The preferred embodiments will be described for a data transmission system including a personal computer and an ink jet printer connected to the personal computer.

(First Embodiment)

A data transmission system according to a first embodiment will be described below with reference to FIGS. 3–9.

Figure 3:
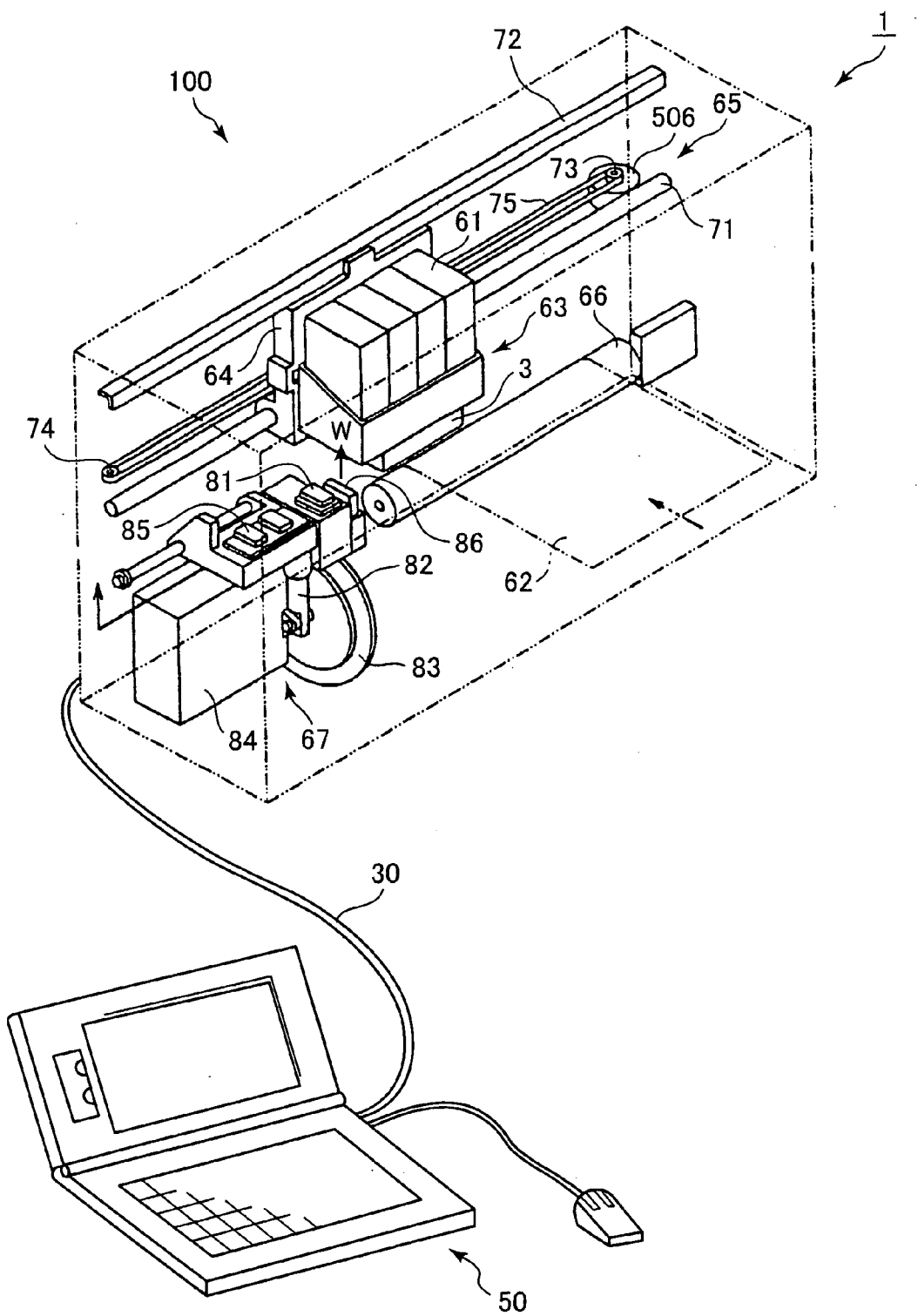
FIG. 3 is a perspective view showing a data transmission system according to a first embodiment of the present invention, and shows a personal computer and the internal construction of an ink jet printer connected thereto in the data transmission system.

FIG. 3 is a perspective view showing the data transmission system 1 of the present embodiment. FIG. 3 shows the personal computer and the internal construction of the ink jet printer connected thereto.

As shown in FIG. 3, an ink jet printer 100 includes: four ink cartridges 61; a head unit 63; a carriage 64; a drive unit 65; a platen roller 66; and a purging device 67. The four ink cartridges 61 are filled with four colors of ink, that is, cyan, magenta, yellow, and black, respectively. The head unit 63 has a print head 3 for printing on a paper 62. The ink cartridges 61 and the head unit 63 are mounted on the carriage 64. The drive unit 65 is for reciprocally moving the carriage 64 along a linear path. The platen roller 66 is disposed in opposition to the print head 3 and extending along the path of the carriage 64. The purging device 67 is for performing purging operation on the print head 3.

The drive unit 65 includes: a carriage shaft 71; a guide plate 72; two pulleys 73 and 74; and an endless belt 75. The carriage shaft 71 is disposed on the bottom end of the carriage 64 and extends parallel to the platen roller 66. The guide plate 72 is disposed on the top of the carriage 64 and extends parallel to the carriage shaft 71. The two pulleys 73 and 74 are disposed on either end of the carriage shaft 71 between the carriage shaft 71 and guide plate 72. The endless belt 75 is looped around the pulleys 73 and 74.

A carriage (CR) motor 506 is for driving the pulley 73 to rotate forward and backward. When the carriage motor 506 drives the pulley 73, the carriage 64 connected to the endless belt 75 is moved reciprocally in a linear path, along the carriage shaft 71 and the guide plate 72, in conjunction with the forward and backward rotation of the pulley 73.

A sheet of paper 62 is fed from a paper supply cassette (not shown), which is provided on one side of the color ink jet printer 100, and is introduced between the print head 3 and the platen roller 66. The print head 3 performs a printing operation by ejecting ink onto the paper 62. The paper 62 is subsequently discharged from the color ink jet printer 100 The mechanisms for feeding and discharging the paper 62 are omitted from the drawing in FIG. 3.

The purging device 67 is provided to one end of the platen roller 66 and opposes the print head 3 when the head unit 63 is in a reset position. The purging device 67 is provided with: a purge cap 81, a pump 82, a cam 83, and an ink reservoir 84. The purge cap 81 is for contacting the surface of the print head 3 and covers nozzle openings formed in the print head 3. When the head unit 63 is in the reset position, the purge cap 81 covers the nozzles in the print head 3. When driven by the cam 83, the pump 82 draws out defective ink in the print head 3 that includes air bubbles and the like in order to restore the print head 3. The defective ink drawn out from the print head 3 is stored in the ink reservoir 84.

A wiper member 86 is disposed at the end of the platen roller 66 and adjacent to the purging device 67. The wiper member 86 has a spatula shape and wipes the surface of the print head 3, where the nozzles are formed, through movement of the carriage 64. When wiping the nozzle surface, the wiper member 86 protrudes in the direction W, but recedes in the opposite direction of the direction W when not wiping the nozzle surface.

A cap 85 is provided to cover the plurality of nozzles in the print head 3 when the printing process ends and the carriage 64 returns to the reset position, in order to prevent the ink from drying.

Figure 4:
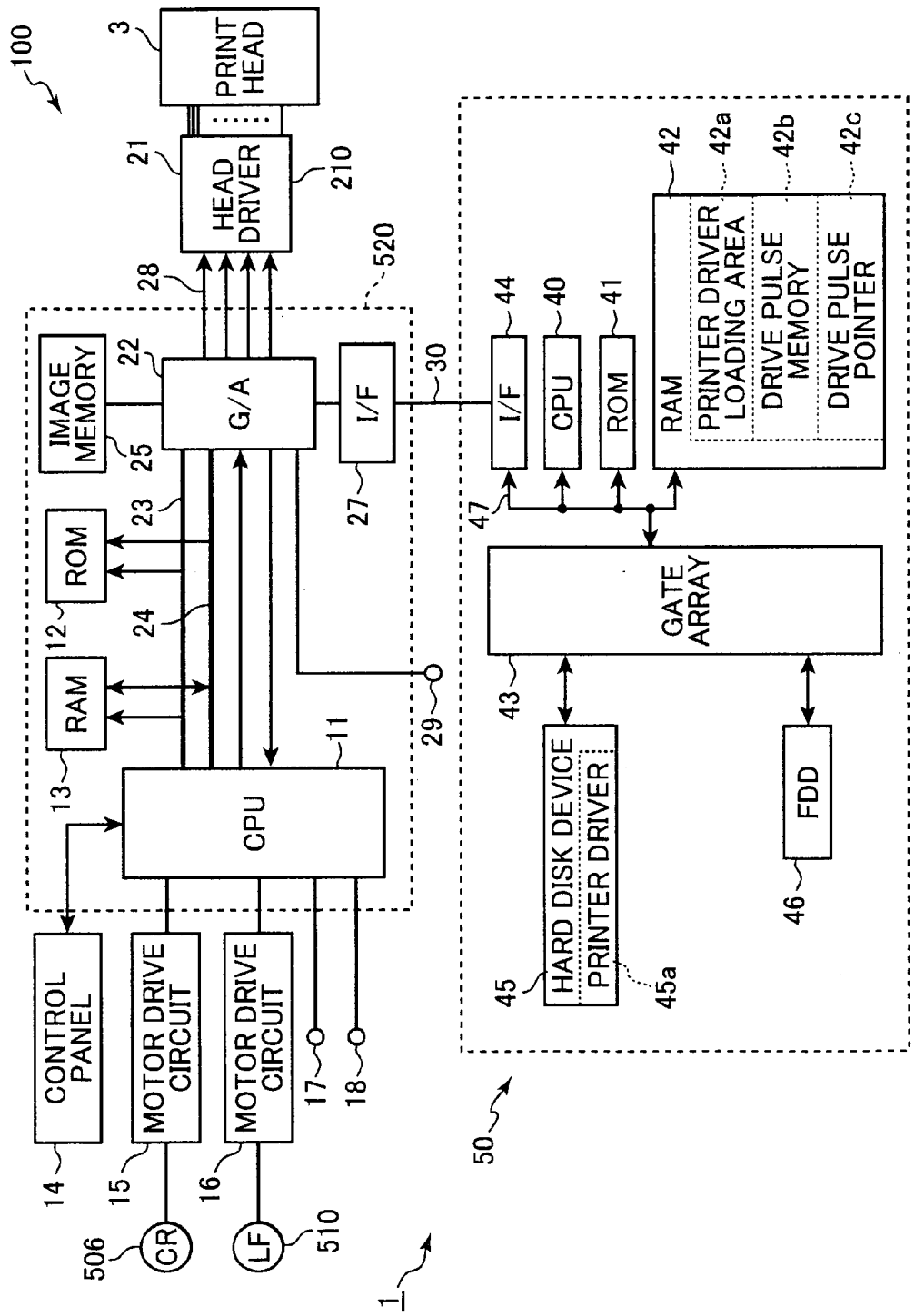
FIG. 4 is a block diagram showing the electrical circuitry of the personal computer and ink jet printer according to the first embodiment.

A connector (not shown) is provided on the back of the ink jet printer 100 for connecting to a Centronics interface 27 (see FIG. 4). The ink jet printer 100 is connected to a personal computer 50 via a cable 30 connected to this Centronics interface 27 in order that the personal computer 50 can transmit print data to the ink jet printer 100. The connection between the ink jet printer 100 and the personal computer 50 is not limited to the cable 30. For example, the personal computer 50 can be connected via optical signals, such as infrared light and the like.

FIG. 4 is a block diagram showing the electrical circuitry of the personal computer 50 and the ink jet printer 100. The personal computer 50 is provided with: a CPU 40, a ROM 41, a RAM 42, a gate array 43, a Centronics interface 44, a hard disk device 45, and a floppy disk drive 46. Of these, the CPU 40, ROM 41, RAM 42, gate array 43, and Centronics interface 44 are connected to one another via a bus line 47, The bus line 47 is configured of an address bus, a data bus, a control signal line, and the like.

The CPU 40 operates based on programs stored in the ROM 41, the operating system (OS) and various application programs stored on the hard disk device 45, and programs provided via the floppy disk drive 46 from a floppy disk (not shown) in order to perform various data processes. The ROM 41 is a nonvolatile memory that cannot be overwritten and is used to store basic programs and various other data for directing operations performed by the CPU 40.

The RAM 42 is a volatile memory that can be overwritten. The RAM 42 includes: a loading area 42*a* for a printer driver 45*a*, a drive pulse memory 42*b*, and a drive pulse pointer 42*c*. The loading area 42*a* is provided to temporarily load the printer driver 45*a* from the hard disk device 45. The drive pulse memory 42*b* stores drive pulse data formed of pulse width data and pulse interval data generated by the printer driver 45*a*. The drive pulse pointer 42*c* is a pointer for indicating the position or address in the drive pulse memory 42*b*. Drive pulse data is stored at addresses of the drive pulse memory 42*b* indicated by the drive pulse pointer 42*c*. The value of the drive pulse pointer 42*c* is incremented by one (1) each time drive pulse data is written to the drive pulse memory 42*b* and set to zero (0) (cleared) when one line of drive pulse data has been transmitted to the ink jet printer 100. Processes for storing drive pulse data in the drive pulse memory 42*b* and for transmitting the stored drive pulse data to the ink jet printer 100 will be described later with reference to the flowchart in FIG. 5.

Figure 5:
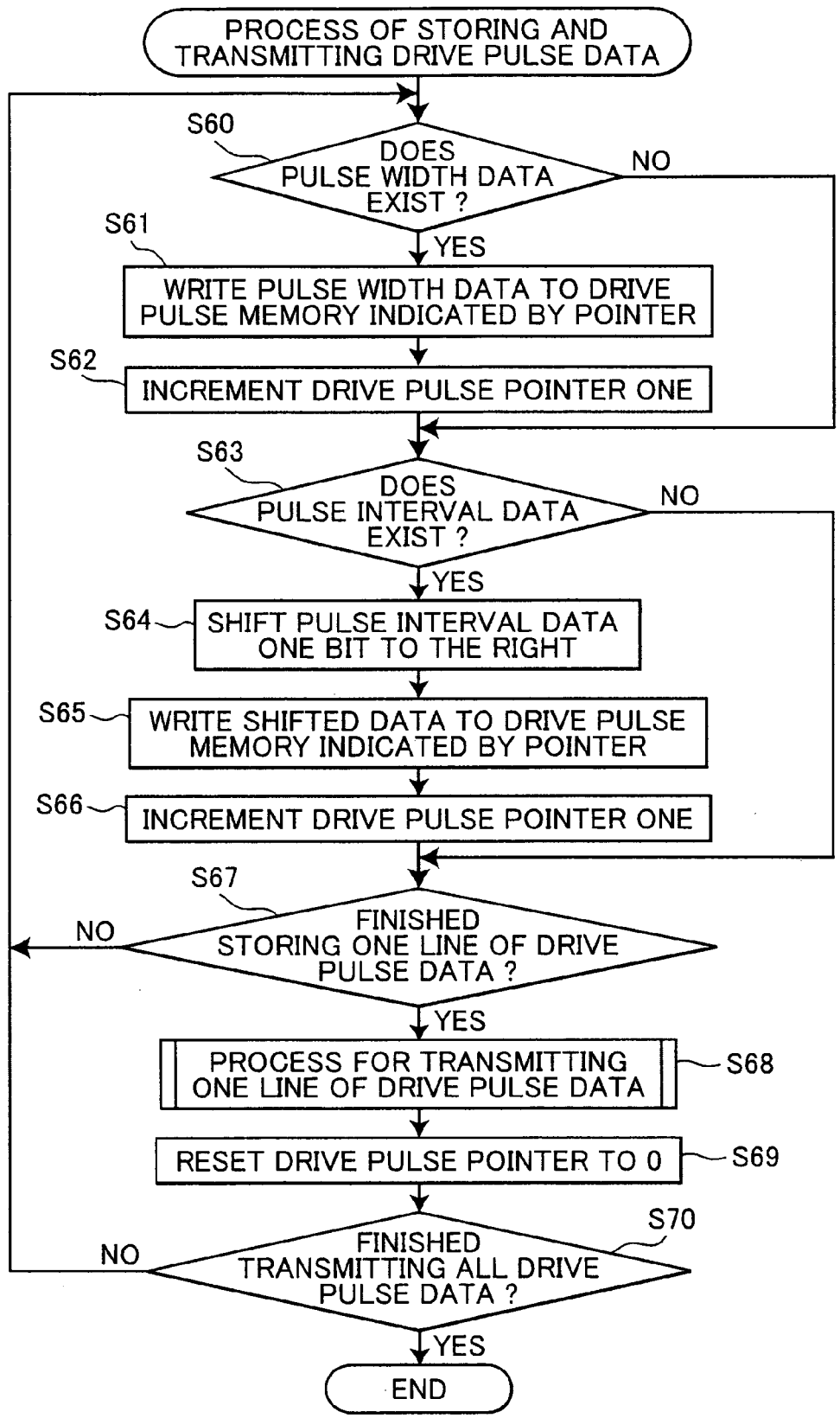
FIG. 5 is a flowchart describing the processes executed by the personal computer for storing and transmitting drive pulse data according to the first embodiment.

The hard disk device 45 is a high-capacity memory that is rewritable. The hard disk device 45 is used for storing the operating system (OS) of the personal computer 50 and various application programs, as well as the printer driver 45*a*. The printer driver 45*a* is a program for generating drive pulse data to drive the print head 3 based on print data created by the application programs and for storing and transmitting this data to the ink jet printer 100 as shown in FIG. 5. In other words, the CPU 40 executes the printer driver 45*a* to first generate drive pulse data based on print data, which has been created in an application program, and then to attain the drive pulse data storing-and-transmitting process of FIG. 5.

It is noted that the printer driver 45*a* may be initially installed in a floppy disk, a CD-ROM, or the like, in a manner readable by the personal computer 50. The printer driver 45*a* may be loaded into the hard disk device 45 so as to be ready by the CPU 40 to execute the process of storing and transmitting drive pulse data shown in FIG. 5.

The gate array 43 functions as an interface between the CPU 40 and the hard disk device 45 and floppy disk drive 46. The Centronics interface 44 connects the personal computer 50 to the ink jet printer 100 via the cable 30, enabling the transmission and reception of data.

The floppy disk drive 46 reads programs stored on a floppy disk mounted therein and writes programs and data to this floppy disk.

The ink jet printer 100 connected to the personal computer 50 includes: a main control circuit board 520, and a carriage circuit board 210. The main control circuit board 520 is provided with: a CPU 11, a ROM 12, a RAM 13, a gate array 22, and the like. The CPU 11 is connected to a control panel 14, a motor drive circuit 15, another motor drive circuit 16, a paper sensor 17, and a point-of-origin sensor 18. The control panel 14 is for enabling a user to input his/her printing instruction and the like. The motor drive circuit 15 is for driving the carriage (CR) motor 506. The motor drive circuit 16 is for driving a linefeed (LF) motor 510. The paper sensor 17 is for detecting the leading edge of the paper 62 (see FIG. 3). The point-of-origin sensor 18 is for detecting the origin position of the carriage 64 (see FIG. 3).

A head driver 21 (driving circuit) is mounted on the carriage circuit board 210. The head driver 21 is for driving the print head 3. The print head 3 and the head driver 21 are connected with each other by a flexible printed circuit board. The flexible printed circuit board includes a copper foil wiring pattern formed on a polyimide film having a thickness of 50–150 μm. The head driver 21 is controlled via the gate array 22, which is mounted on the main control circuit board 520, to apply drive pulses to each drive element on the print head 3.

An encoder sensor 29 is connected to the gate array 22 for detecting the position of the carriage 64. The CPU 11, ROM 12, RAM 13, and gate array 22 are connected to one another through an address bus 23 and a data bus 24. The CPU 11 generates a print timing signal, a reset signal, and first and second basic clock signals 113 and 114, and transfers these signals to the gate array 22 according to a program stored in the ROM 12.

It is noted that the first and second basic clock signals 113 and 114 have different cycles or time periods as shown in FIGS. 9(*b*) and 9(*c*). More specifically, the first basic clock signal 113 has a time period "a", and the second basic clock signal 114 has a time period "b" which is twice as long as the time period "a" of the first basic clock signal.

An image memory 25 is connected to the gate array 22. The gate array 22 stores drive pulse data transferred from the personal computer 50 via the Centronics interface 27 in the image memory 25. In conformance with control signals received from the encoder sensor 29 and the print timing signal, the gate array 22 outputs, based on drive pulse data stored in the image memory 25: a drive pulse, a transmission clock CLK, a latch signal, parameter signals, and an ejection timing signal JET. The drive pulse is for driving the print head 3. The transmission clock CLK is synchronized to the drive pulse. The parameter signals are for generating a basic print waveform signal. The ejection timing signal JET is outputted in a fixed cycle. The gate array 22 transfers these signals to the carriage circuit board 210, on which the head driver 21 is mounted.

The gate array 22 generates a Centronics data reception interrupt signal based on Centronics data transferred from the personal computer 50 via the Centronics interface 27 and transfers the signal to the CPU 11. Signals are transferred between the gate array 22 and the carriage circuit board 210 via a harness cable 28 connecting the gate array 22 and the carriage circuit board 210. The harness cable 28 is formed of a flexible cable.

Next, the process for storing and transmitting drive pulse data executed by the personal computer 50 will be described with reference to the flowchart in FIG. 5 for the data transmission system 1 according to the present embodiment.

The CPU 40 attains this drive pulse data storing-and-transmitting process by executing the printer driver 45*a* after the CPU 40 generates, also according to the printer driver 45*a*, drive pulse data based on print data created in an application program.

It is noted that the drive pulse data is made from: 7-bit pulse width data $Hx=(hx6, hx5, hx4, hx3, hx2, hx1, hx0)$ and 9-bit pulse interval data $Lx=(lx8, lx7, lx6, lx5, lx4, lx3, lx2, lx1, lx0)$ as shown in FIG. 6. The ink jet printer 100 processes drive pulse data transferred from the personal computer 50 in 8-bit units.

When the storing-and-transmitting process is started, first, in S60, the CPU 40 determines whether or not the drive pulse data contains pulse width data. If the drive pulse data contains pulse width data (Yes in S60), the pulse width data is written in S61 to the drive pulse memory 42*b* at an address indicated by the drive pulse pointer 42*c*. Because data can be written to the drive pulse memory 42*b* in 8-bit units, an empty region is formed in the $7^{th}$ bit (most significant bit) of the drive pulse memory 42*b* in which the 7-bit pulse width data is written A free bit (0) is entered in the $7^{th}$ bit location. In this way, the 7-th bit pulse width data is converted into an 8-bit data segment.

After the pulse width data is written in S61, in order to prepare for writing the next data, the value of the drive pulse pointer 42*c* is incremented by one (1) in S62, thereby changing the address in the drive pulse memory 42*b* indicated by the drive pulse pointer 42*c*.

After the pulse width data has been written or when the drive pulse data contains no pulse width data (No in S60), the CPU 40 determines in S63 whether or not the drive pulse data contains pulse interval data. If pulse interval data exists (Yes in S63), then the CPU 40 divides the pulse interval data by an integer, such as 2, in S64. More specifically, the pulse interval data is shifted one bit toward the lower order (i.e., to the right), thereby deleting the least significant bit ($0^{th}$ bit) of the original 9 bits, In this way, the process of S64 serves to convert the 9-bit pulse interval data into an 8-bit data segment by reducing the amount of the 9-bit pulse interval data. The remaining 8 bits of pulse interval data are written to the drive pulse memory 42*b* at the address indicated by the drive pulse pointer 42*c* in S65. By treating the pulse interval data as 8 bits in this manner, the drive pulse data including the 7-bit pulse width data and the 9-bit pulse interval data can undergo the subsequent process as two 8 bit data segments (a 16-bit (2-byte) segment). After the thus bit-shifted pulse interval data is written, the value of the drive pulse pointer 42c is incremented by one (1) in S66 to prepare for writing the next data.

Subsequently, the CPU 40 determines whether or not writing of one line of drive pulse data has been completed. If the writing of one line of data is completed (Yes in S67) the written line of data is transmitted in S68 via the Centronics interface 44 to the image memory 25 in the ink jet printer 100. In this way, a plurality of 8-bit data segments for one line are transmitted to the ink jet printer 100.

After transmitting the drive pulse data to the image memory 25, the value of the drive pulse pointer 42c is reset to 0 (zero) or cleared in S69. In S70, the CPU 40 determines whether or not all drive pulse data has been transmitted. If all data has been transmitted (Yes in S70), the process for transmitting and storing drive pulse data ends.

If the process for writing one line of data is not completed (No in S67) or if not all drive pulse data has been transmitted (No in S70), the process is repeated from S60. In this way, when the drive pulse data including 7 bits of pulse width data and 9 bits of pulse interval data is transmitted to the ink jet printer 100, it is possible to transmit the data in 16-bit (2-byte) segments.

In this way, according to the present embodiment, the pulse interval data of 9 bits is transmitted as a data of 8 bit capacity to the ink jet printer 100.

FIG. 5 is a diagram showing how the drive pulse data, which is transmitted from the personal computer 50 in 8-bit data units as described above, is stored in the image memory 25 of the ink jet printer 100. As described above with reference to FIG. 5, the $0^{th}$ bit of data (lx0) is deleted from the original 9-bit pulse interval data Lx=(lx8, lx7, lx6, lx5, lx4, lx3, lx2, lx1, lx0) and transmitted to the image memory 25 as 8-bit (1-byte) pulse interval data Lx=(lx8, lx7, lx6, lx5, lx4, lx3, 1x2, lx1) Because the ink jet printer 100 stores data in the image memory 25 in 8-bit (1-byte) units, the pulse interval data L0 (=Lx, where x=0) is stored at address 0001H of the image memory 25, for example. Accordingly, 1 byte of effective memory space can be saved in comparison with the conceivable example (FIG. 2) that requires two bytes to store the 9 bits of data.

It is noted that the print head 3 of the present embodiment is controlled by the head driver 21 to form one dot of an image by a drive pulse consisting of three pulse widths (high pulses) and two pulse intervals (low pulses). Hence, three bytes of pulse width data H0, H1, and H2 are stored at addresses 0000H, 0002H, and 0004H in the image memory 25, and two bytes of pulse interval data L0 and L1 are stored at addresses 0001H and 0003H in the image memory 25. Therefore, it is possible to reduce the memory consumption by two bytes for forming one dot of an image in comparison with the conceivable example that uses seven bytes for forming one dot of an image as shown in FIG. 2.

It is noted that beginning from the memory address 0005H, pulse width data and pulse interval data will be further stored alternately in blocks of 5 bytes. Five bytes of drive pulse data stored in the image memory 25 are used by the gate array 22 to generate three drive pulses and two drive intervals for driving the print head 3 for forming one dot of an image.

Next will be described, with reference to FIGS. 7 and 8, how the gate array 22 decodes drive pulses based on the drive pulse data that consists of the above-described pulse width data H0, H1, and H2 and pulse interval data L0 and L1.

FIG. 7 is a block diagram showing the circuitry of the gate array 22, according to the present embodiment, that generates the drive pulses.

FIG. 8 shows a timing chart for the drive pulse outputted from the gate array 22.

As shown in FIG. 7, the gate array 22 includes a drive pulse end signal generating circuit 97, an AND circuit 90, counters 91–95, and an OR circuit 96.

Before ink ejection begins, the circuit 97 outputs a drive pulse end signal to the AND circuit 90 via a signal line 112. The signal outputted prior to the start of ejection is a high pulse 112a (see FIG. 8). When the CPU 11 outputs a high pulse 101a via a signal line 115 as an ejection request signal, the drive pulse end signal generating circuit 97 outputs a low pulse 112b (FIG. 8). When a high pulse 111a (FIG. 8) is outputted from the counter 95 via a signal line 111, the circuit 97 outputs a high pulse 112c (FIG. 8) via the signal line 112. Then, a high pulse is continually outputted until the next ejection request signal 101a is received.

The AND circuit 90 takes the logical product of the high pulse 101a (FIG. 8) outputted from the CPU 11 as an ejection request signal and the high pulse 112a (FIG. 8) outputted from the circuit 97 as a drive pulse end signal. The AND circuit 90 outputs a high pulse 102a (FIG. 8) to the counter 91 via a signal line 102.

To print each dot of an image, one set of drive pulse data including the pulse width data H0, H1, and H2 and the pulse interval data L0 and L1 is loaded from the image memory 25 into the counters 91–95 via a signal line 116. In this case, data H0 is loaded into the counter 91, data L0 is loaded into the counter 92, data H1 is loaded into the counter 93, data L1 is loaded into the counter 94, and data H2 is loaded into the counter 95. In addition, the first basic clock signal 113 is inputted into the counters 91, 93, and 95 via a signal line 117, and the second basic clock signal 114 is inputted into the counters 92 and 94 via a signal line 118. The first basic clock signal 113 has a time period "a" as shown in FIG. 9(b), and the second basic clock signal 114 has a time period "b" as shown in FIG. 9(c), wherein b=2a.

The counter 91 is for setting the length (110a in FIG. 9) of the drive pulse width based on the pulse width data H0 (FIG. 6) loaded from the image memory 25. When the counter 91 receives the high pulse 102a from the AND circuit 90 via the signal line 102, the counter 91 outputs a high pulse 103a (FIG. 8) to the OR circuit 96 via a signal line 103. The counter 91 begins counting of the first basic clock signal 113 simultaneously when outputting the high pulse 103a. When the count value reaches the pulse width data H0, the counter 91 complete counting and changes the high pulse 103a to a low pulse 103b (FIG. 8). The high pulse 103a of the width 110a formed in this way is outputted from the OR circuit 96 via a signal line 110. After completing counting, the counter 91 is reset to 0, and the counter 91 outputs a high pulse 104a to the counter 92 via a signal line 104.

The counter 92 is for setting the length (110b in FIG. 8) of the interval between drive pulses based on the pulse interval data L0 (FIG. 6) loaded from the image memory 25. The counter 92 begins counting the second basic clock signal 114 simultaneously when receiving the high pulse 104a outputted from the counter 91. When the count value reaches the pulse interval data L0, the counter 92 completes counting. When the counter 92 completes counting, the counter 92 is cleared, and the counter 92 outputs a high pulse 105a to the counter 93 via signal line 105.

As described later, the OR circuit 96 outputs a high pulse 106a that is outputted from the counter 93 at the same time the high pulse 105a is outputted, as shown in FIG. 8. As a result, the OR circuit 96 forms the pulse interval 110b.

The counter 93 is for setting the length (110c in FIG. 8) of the drive pulse width based on the pulse width data H1 (FIG. 6) loaded from the image memory 25. When the counter 93 receives the high pulse 105a from the counter 92, the counter 93 outputs a high pulse 106a to the OR circuit 96 via a signal line 106. The counter 93 begins counting the first basic clock signal 113 simultaneously when outputting the high pulse 106a. When the count value reaches the pulse width data H1, the counter 93 stops counting and changes the high pulse 106a to a low pulse 106b (FIG. 8). The high pulse 106a of the width 110c formed in this way is outputted from the OR circuit 96. After completing counting, the counter 93 is reset to 0, and the counter 93 outputs a high pulse 107a to the counter 94 via a signal line 107.

The counter 94 is for setting the length (110d in FIG. 8) of the interval between drive pulses based on the pulse interval data L1 (FIG. 6) loaded from the image memory 25. The counter 94 begins counting the second basic clock signal 114 simultaneously when receiving the high pulse 107a from the counter 93. When the count value reaches the pulse interval data L1, the counter 94 completes counting. When the counter 94 completes counting, the counter 94 is cleared, and the counter 94 outputs a high pulse 108a to the counter 95 via signal line 108.

As described later, the OR circuit 96 outputs a high pulse 109a that is outputted from the counter 95 at the same time the high pulse 108a is outputted, as shown in FIG. 8. As a result, the OR circuit 96 forms the pulse interval 110d.

The counter 95 is for setting the length (110e in FIG. 8) of the drive pulse width based on the pulse width data H2 (FIG. 6) loaded from the image memory 25. When the counter 95 receives the high pulse 108a from the counter 94, the counter 95 outputs the high pulse 109a to the OR circuit 96 via a signal line 109. The counter 95 beings counting the first basic clock signal 113 simultaneously when outputting the high pulse 109a. When the count value reaches the pulse width data H2, the counter 95 completes counting, and changes the high pulse 109a to a low pulse 109b (FIG. 8) and outputs the low pulse 109b via the signal line 109. Therefore, the high pulse 109a of the width 110e formed in this way is outputted from the OR circuit 96. After the counter 95 completes counting, the counter 95 is reset to 0, and the counter 95 outputs a high pulse 111a to the drive pulse end signal generating circuit 97 via the signal line 111.

In this way, the OR circuit 96 outputs drive pulses that are a series of high and low pulses outputted In order from the counters 91–95 via the signal line 110.

It is noted that as shown in FIG. 8, after the OR circuit 96 outputs drive pulses including three high pulses 110a, 110c, and 110e and two low pulses 110b and 110d, an interval 110f continues until the next high pulse 110a is outputted as an ejection request signal, and the process described above is repeated in a cycle.

Figure 9A:
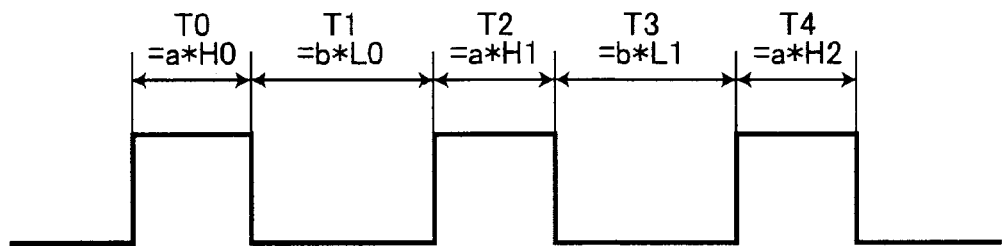
FIG. 9(a) is a timing chart of the drive pulses.
Figure 9B:
FIG. 9(b) is a timing chart of a first basic clock signal used for generating the drive pulses.
Figure 9C:
FIG. 9(c) is a timing chart of a second basic clock signal used for generating the drive pulses.

FIG. 9(a) shows the drive pulses formed in the above-described process, while FIGS. 9(b) and 9(c) show the basic clock signals 113 and 114 used for generating these drive pulses. The pulse width data H0, H1, and H2, each of which includes 7 bits, are processed in the counters 91, 93, and 95, respectively, to generate corresponding pulse widths T0, T2, and T3 based on the first basic clock signal 113 having the first basic time period "a", shown in FIG. 9(b). The pulse interval data L0 and L1, each of which originally includes 9 bits and reduced to 8 bits (1 byte) in the process of S64 (FIG. 5), are processed in the counters 92 and 94, respectively, to generate corresponding desired pulse intervals T1 and T3 based on the second basic clock signal 114 having the second basic time period "b" (which is equivalent to "2a"), shown in FIG. 9(c). Because the second basic time period "b" is set to twice the first basic time period "a", the pulse interval data, which has been shifted right by one bit thereby reducing the amount of data in half, is decoded properly based on this second basic time period "b". Accordingly, the second basic time period "b" of the second basic clock signal is set in correspondence with the amount of the bit-shift executed in S64 and with the first basic time period "a".

Because the gate array 22 performs the decoding operation in this way, it is possible to reduce the amount of time required to drive the ink jet printer 100 after the personal computer 50 has transmitted the drive pulse data to the ink jet printer 100, thereby completing the printing operation in a shorter amount of time and reducing the user's stress.

As described above, according to the data transmission system 1 for transmitting drive pulse data from the personal computer 50 to the ink jet printer 100 in 8-bit units, the drive pulse data includes 7 bits of pulse width data Hx and 9 bits of pulse interval data Lx. The personal computer 50 reduces pulse interval data, which has an amount of data exceeding 8 bits, in half by shifting the bits one place to the right before transmitting the data to the ink jet printer 100. The basic time period used for decoding the pulse interval data is set to twice the basic time period used for decoding the pulse width data. The pulse interval data is therefore properly decoded based on this longer basic time period.

In this way, in order to process, in 8-bit units, pulse interval data, which is originally 9 bits of data, the personal computer 50 deletes the $0^{th}$ bit (low-order end bit) of the pulse interval data prior to transmission in order to reduce the original 9 bits of data to 8 bits (1 byte). In the conceivable example of FIG. 2, 9-bit pulse interval data is transmitted essentially as 16 bits (2 bytes). According to the data transmission system of the present embodiment, therefore, it is possible to transmit drive pulse data to the ink jet printer 100 in a shorter amount of time relative to the conceivable example. In addition, when the ink jet printer 100 receives such pulse interval data, the amount of memory expended in the image memory 25 for storing the pulse interval data can be reduced.

According to the present embodiment, each of the counters 91, 93, and 95 counts the first basic clock signal 113 up to a value indicated by the corresponding data-non-reduced pulse width data H0, H1, H2, shown in FIG. 6. Each of the counters 92 and 94 counts the second basic clock signal 114 up to a value indicated by the corresponding data-reduced pulse interval data L0, L1. The counter 92 starts its counting operation successively after the counter 91 completes its counting operation. The counter 93 starts its counting operation successively after the counter 92 completes its counting operation. The counter 94 starts its counting operation successively after the counter 93 completes its counting operation. The counter 95 starts its counting operation successively after the counter 94 completes its counting operation. Accordingly, it is possible to alternately decode the pulse width data and the pulse interval data in succession.

In the above-described embodiment, the ink jet printer 100 generates drive pulses that consists of three pulse widths (high pulses) and two pulse intervals (low pulses) in order to produce each dot of an image. Therefore, the gate array 22 is provided with five counters 91–95, However, the number of counters is not limited to five.

In the present embodiment, the amount of pulse interval data transmitted to the ink jet printer is divided in half by shifting the 9-bit pulse interval data one bit to the right before transmitting the data from the personal computer 50.

However, the method for reducing the amount of data is not limited to division, but can also be a method of subtraction.

Further, the amount of reduction is not limited to one half. For example, if the pulse width data or pulse interval data is configured of 10 bits, the data can be reduced to fit in 8 bits or smaller. In this case, the basic time period "b" of the basic clock, to be used to decode the amount-reduced data, is increased at a rate that corresponds to the rate of data reduction.

For example, if the pulse interval data is configured of 10 bits, the data can be reduced to 8 bits. That is, the data is divided in quarter by shifting the 10-bit pulse interval data two bits to the right before transmitting the data from the personal computer 50. In this case, the second basic time period "b" is set to be as four times as longer than the first basic time period "a".

In the above-described embodiment, the data amount of the pulse interval data is reduced to a value equal to the amount (8 bits) of a data unit to be processed by the ink jet printer 100. However, the data amount of the pulse interval data may be reduced to a value smaller than the amount (8 bits) of the data unit.

In the embodiment described above, the amount of data is reduced in half and decoded based on the second basic clock signal having the second basic time period "b". However, the method for decoding is not limited to using the second basic clock signal. For example, the present embodiment can be configured to decode the received 8-bit pulse interval data simply by multiplying the 8-bit data by a value "2" to recover the original 9-bit pulse interval data. In this case, it is unnecessary to use the second basic clock signal. It is possible to easily decode data.

The personal computer 50 can be configured to convert the 9-bit pulse interval data into an 8-bit data segment by simply subtracting data from the 9-bit pulse interval data. In this case, the ink jet printer 100 may decode the received 8-bit pulse interval data by simply adding the subtracted data to the received 8-bit data, to recover the 9-bit original data.

In the above-described embodiment, the pulse width data has the data amount that does not exceed 8 bits, and the pulse interval data has the data amount that exceeds 8 bits. However, the pulse width data may have the data amount that exceeds 8 bits, and the pulse interval data may have the data amount that does not exceed 8 bits. In this case, the amount of the pulse width data is reduced, and will be decoded by using the second basic time period "b", while the amount of the pulse interval data is not reduced, and will be decoded by using the first basic time period "a".

(Second Embodiment)

Next, a data transmission system according to a second embodiment will be described with reference to FIGS. 10–11(b).

The data transmission system 1 according to the present embodiment has almost the same configurations with the data transmission system 1 according to the first embodiment (FIGS. 3, 4, and 7) except for the points described below.

According to the present embodiment, the CPU 11 generates the first basic clock signal 113 with the predetermined period of time "a", but does not produce the second basic clock signal 114. The CPU 11 outputs the first basic clock signal 113 to the gate array 22. According to the present embodiment, therefore, all the counters 91–95 in the gate array (GS/A) 22 (FIG. 7) are designed to receive the first basic clock signal 113 only.

Figure 10:
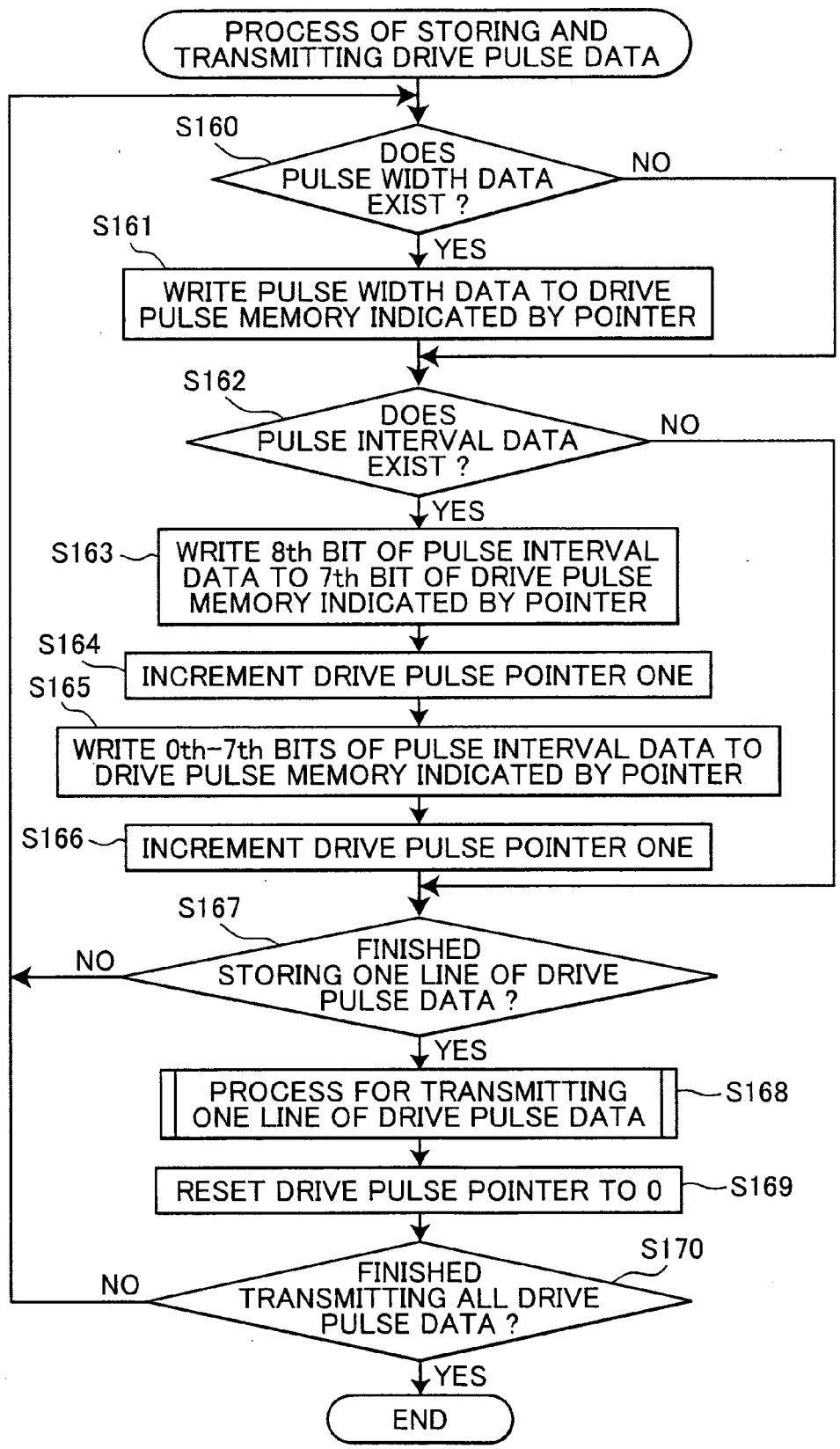
FIG. 10 is a flowchart describing the processes executed by the personal computer for storing and transmitting drive pulse data according to a second embodiment.

According to the present embodiment, the CPU 40 in the personal computer 50 performs the drive pulse data storing and transmitting process as shown in FIG. 10, instead of executing the process of FIG. 5.

First, in S160 and S161, processes are executed in the same manner as in the processes of S60 and S61 (FIG. 5) in the first embodiment. It is noted that because pulse write data is written to the drive pulse memory 42b in 8-bit units, an empty region is formed in the $7^{th}$ bit (most significant bit) of the drive pulse memory 42b in which the 7-bit pulse width data is written. According to the present embodiment, however, no free bit is written in the $7^{th}$ bit location, but the 8 bit (most significant bit) of the 9-bit pulse interval data will be entered in the $7^{th}$ bit location as will be described below.

After the pulse width data is written or if the drive pulse data does not contain pulse width data (No in S160), the CPU 40 determines in S162 whether or not the drive pulse data contains pulse interval data. If the drive pulse data contains pulse interval data (Yes in S162), then the $8^{th}$ bit (most significant bit) of the pulse interval data is written in S163 to the $7^{th}$ bit (most significant bit) position of the drive pulse memory 42b at the address indicated by the drive pulse pointer 42c. As a result, the $8^{th}$ bit in the pulse interval data and all the 7 bits of the pulse width data are stored in the address in the drive pulse memory 42b indicated by the drive pulse pointer 42c. In this way, the CPU 40 embeds a portion of the 9-bit pulse interval data in the unused portion of an 8-bit data segment that includes the 7-bit pulse width data, thereby converting the 7-bit pulse width data and the portion of the 9-bit pulse interval data into one 8-bit data segment.

Next, the value of the drive pulse pointer 42c is incremented one in S164, changing the address of the drive pulse memory 42b indicated by the drive pulse pointer 42c.

In S165, the remaining 8 bits of pulse interval data from the $0^{th}$ bit (least significant bit) to the $7^{th}$ bit are written to an address in the drive pulse memory 42b now indicated by the drive pulse pointer 42c. In this way, the CPU 40 converts the $0^{th}$–$7^{th}$ bits of the 9-bit pulse interval data into an 8-bit data segment. Since the $8^{th}$ bit in the pulse interval data is embedded in the blank region of the drive pulse memory 42b in which the pulse width data of 7 bits is written, the drive pulse data including 7 bits of pulse width data and 9 bits of pulse interval data will be processed as two 8-bit data segments, i.e., a 16-bit (2 bytes) segment. After writing the remaining pulse interval data from the $0^{th}$ bit (least significant bit) to the $7^{th}$ bit, the value of the drive pulse pointer 42c is again incremented one in S166, and the next drive pulse data is stored.

Next, in the steps S167–S170, the processes are executed in the same manner as the steps S67–S70 (FIG. 5) in the first embodiment. Thus, drive pulse data is transmitted to the ink jet printer 100 in 8-bit data units.

Figures 11A, 11B:
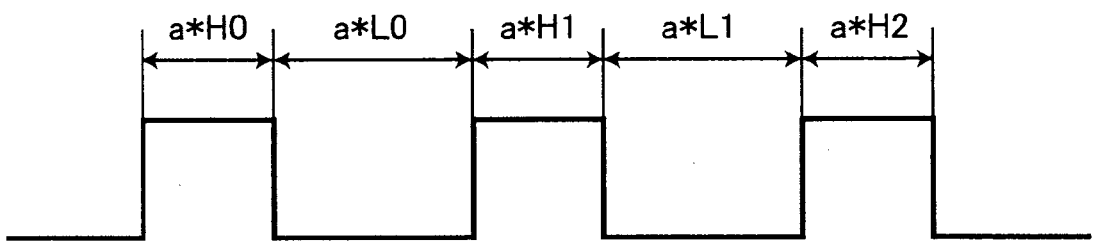
FIG. 11(a) is a diagram showing how drive pulse data transmitted from the personal computer by the process of FIG. 10 is stored in the memory of the ink jet printer.

FIG. 11(a) is a diagram showing how the drive pulse data, which is transmitted from the personal computer 50 in 8-bit data units as described above, is stored in the image memory 25 of the ink jet printer 100.

As shown in FIG. 11(b), the drive pulse data includes the 7-bit pulse width data Hx=(hx6, hx5, hx4, hx3, hx2, hx1, hx0) and the 9-bit pulse interval data Lx=(lx8, lx7, lx6, lx5, lx4, lx3, lx2, lx1, lx0). Of this drive pulse data, 8 bits of data including the 7-bit pulse width data H0=(h06, h05, h04, h03, h02, h01, h00) and the $8^{th}$ bit of the pulse interval data (l08) of the original 9-bit pulse interval data L0=(l08, l07, l06, l05, l04, l03, l02, l01, l00) is stored at the 0000H address in the image memory 25, The remaining 8 bits (l07, l06, l05, l04, l03, l02, l01, l00) of the pulse interval data from the $0^{th}$ bit to the $7^{th}$ bit are stored at address 0001H.

It is noted that also in this example, the print head 3 is controlled by the head driver 21 to form one dot of an image by a series of drive pulses consisting of three high pulses with pulse widths and two low pulses with pulse intervals. Hence, pulse width data H0 and pulse interval data L0, which have two bytes in total, are stored at addresses 0000H to 0001H in the image memory 25, and pulse width data H1 and pulse interval data L1, which have two bytes in total, are stored at addresses 0002H to 0003H in the image memory 25. Then, pulse width data H2 is stored at address 0004H in the image memory 25. Therefore, it is possible to reduce the memory consumption by two bytes for forming one dot of an image in comparison with the conceivable example that uses seven bytes for forming one dot of an image as shown in FIG. 2.

In this way, it is possible to reduce the volume of the image memory 25 expended when storing drive pulse data therein.

FIG. 11(b) shows the drive pulses formed by the gate array 22 based on this drive pulse data. It is noted that according to the present embodiment, the gate array 22 has almost the same structure and performs almost the same operation as the gate array 22 in the first embodiment (FIGS. 7 and 8) except for the following points.

According to the present embodiment, all of the counters 91–95 receive the first basic clock signal 113 with the first basic time period "a" shown in FIG. 9(b).

The gate array 22 decodes the drive pulse data (pulse width data and pulse interval data) stored in the image memory 25 to form the series of drive pulses (FIG. 11(b)) for driving the print head 3. During the decoding process, the gate array 22 recognizes the lower-order 7 bits in the first 8 bits read from the image memory 25 as pulse width data and the remaining most significant bit and the next 8 bits read from the image memory 25 as pulse interval data, knowing the rule that the pulse width data includes 7 bits and the pulse interval data includes 9 bits. The gate array 22 combines the most significant bit (108) in the first 8 bits with the next 8 bits (107, 106, 105, 104, 103, 102, 101, 100), thereby recovering the original 9-bit pulse interval data Lx=(108, 107, 106, 105, 104, 103, 102, 101, 100). While this process can be implemented in software, the process can also easily be configured using a hardware circuit.

In this way, the gate array 22 decodes the drive pulse data stored in the image memory 25 to form a series of drive pulses, shown in FIG. 11(b), by using the first basic clock signal of the predetermined basic time period "a". More specifically, the gate array 22 creates a series of drive pulses so that a first high pulse will have a pulse width of "a×H0", a first low pulse will have an interval length of "a×L0", a second high pulse will have a pulse width of "a×H1", a second low pulse will have an interval length of "a×L", and a third high pulse will have a pulse width of "a× H2", by using the first basic clock signal having the first basic time period "a" and using the counters 91–95.

Figure 1B:
FIG. 1(b) is a timing chart of a basic clock signal used for generating the drive pulses in FIG. 1(a)

In the data transmission system 1 according to the present embodiment, as described above, drive pulse data including 7 bits of pulse width data and 9 bits of pulse interval data transferred from the personal computer 50 is processed in 8-bit units. In the conceivable example shown in FIGS. 1(a)–2, this data is transmitted in 24-bit (3-byte) units. Contrarily, the data transmission system 1 of the present embodiment transmits the data in 16-bit (2-byte) units only, because the $8^{th}$ bit (lx8) of the pulse interval data is inserted in the empty region of the drive pulse memory 42b containing the pulse width data and is transmitted along with the pulse width data.

Hence, the drive pulse data can be transmitted to the ink jet printer 100 in a shorter amount of time, Further, the capacity of the image memory 25 required to store drive pulse data received by the ink jet printer 100 can be reduced.

As described above, in the data transmission system 1, drive pulse data is transmitted from the personal computer 50 to the ink jet printer 100, where the drive pulse data is processed in 8-bit units. The drive pulse data includes 7 bits of pulse width data Hx and 9 bits of pulse interval data Lx Accordingly, the personal computer 50 inserts the $8^{th}$ bit of pulse interval data (lx8) in a free part of the storage area that stores the 7-bit pulse width data, and transmits this bit together with the pulse width data to the ink jet printer 100. The data is stored in the image memory 25 of the ink jet printer 100. Accordingly, the data transmission system 1 can transmit drive pulse data from the personal computer 50 to the ink jet printer 100 in a short amount of time and reduce the required capacity of the image memory 25.

In the present embodiment, when the drive pulse data transmitted from the personal computer 50 includes 7 bits of pulse width data and 9 bits of pulse interval data, one bit of the pulse interval data is inserted in a portion of the segment containing the pulse width data. However, the number of bits for the pulse width data and pulse interval data is not limited to 7 bits and 9 bits, respectively. For example, for a drive pulse data including 6 bits of pulse width data and 10 bits of pulse interval data, it is possible to insert two bits of pulse interval data in the segment containing the pulse width data.

Further, in the embodiment described above, the $8^{th}$ bit (most significant bit) of the 9-bit pulse interval data is inserted in the empty $7^{th}$ bit (most significant bit) of the 7-bit pulse width data. It is therefore possible to easily write the portion of the pulse interval data in the memory area storing the pulse width data and also to easily decode such data. However, the portion of the pulse interval data inserted in the pulse width data is not limited to the $8^{th}$ bit (most significant bit), but can also be the $0^{th}$ bit (least significant bit) of data. Still in this case, it is possible to easily write the portion of the pulse interval data in the memory area containing the pulse width data and also to easily decode such data. In this case, the $0^{th}$ bit (least significant bit) of pulse interval data is preferably inserted in the $0^{th}$ bit (least significant bit) of the drive pulse memory 42b for storing the pulse width data, in order to increase the efficiency of subsequent decoding.

It is preferable that a maximum bit number is previously determined for the number of pulse interval data bits inserted in the high-order end or low-order end of the pulse width data. In such a case, the ink jet printer 100 can read and process the high-order portion or low-order portion of the pulse width data as part of the pulse interval data when processing data in 8-bit units. If there is no data in the high-order or low-order portion of the pulse width data, the ink jet printer 100 can process only the contents of the next 8 bits as pulse interval data.

It is noted that the high-order end (most significant bit) of the pulse interval data bits may be inserted in the low-order end (least significant bit) of the pulse width data. Or, the low-order end (least significant bit) of the pulse interval data bits may be inserted in the high-order end (most significant bit) of the pulse width data. It may be possible to embed data at any digit in the pulse interval data into any digit location in the memory area storing the pulse width data.

In the above-described embodiment, the pulse width data has the data amount that does not exceed 8 bits, and the pulse interval data has the data amount that exceeds 8 bits. However, the pulse width data may have the data amount that exceeds 8 bits, and the pulse interval data may have the data amount that does not exceed 8 bits. In this case, the exceeded portion of the pulse width data is inserted in a portion of the segment containing the pulse interval data.

While the invention has been described in detail with reference to the specific embodiments thereof, it would be apparent to those skilled in the art that various changes and modifications may be made therein without departing from the spirit of the invention.

For example, in the above-described embodiments, the data transmission system is directed to the system including a personal computer and an ink jet printer. However, the present invention can be applied to various types of data transmission system, in which a transmission device transmits data to a reception device, in which both of the transmission device and the reception device process data in data segments of a predetermined amount, and in which the data includes: pulse width data specifying a pulse width, and pulse interval data specifying the interval length.

In the above-described first embodiment, by using the first and second basic clock signals 113 and 114, it is possible to easily configure two basic time periods "a" and "b" that have different lengths from each other. It is possible to easily process data that does not exceed the predetermined amount, as well as data that does exceed the predetermined amount. Also in the second embodiment, by using the first basic clock signal 113, it is possible to easily configure the basic time period "a". However, both of the embodiments may not use any clock signals for decoding operations. The gate array 22 may have any structure that can perform the decoding operation. By designing the gate array 22 so as to be capable of decoding the received drive pulse data into information indicative of the original drive pulse data, the ink jet printer 100 can treat data, which has been converted by the personal computer 50, in the usual manner.

What is claimed is:

1. A data transmission system, comprising:
   a transmission device, including:
      a converting unit receiving two sets of pulse/interval data indicative of two lengths,
      the two sets of pulse/interval data including one set of pulse width data indicative of a length of one pulse width and one set of pulse interval data indicative of a length of one pulse interval, the converting unit converting the two sets of pulse/interval data into two sets of successive data segments, each data segment including data of a predetermined amount; and
      a transmission unit transmitting the two data segments, each data segment containing data of the predetermined amount; and
      a reception device receiving the two data segments from the transmission device and processing the data segments.

2. A data transmission system, as claimed in claim 1, wherein the reception device includes:
   a printing device;
   a decoding device decoding the received two data segments into a drive pulse and a drive interval, the pulse width of the drive pulse having the length indicated by the pulse width data, the drive interval having the length indicated by the pulse interval data; and
   a driving device driving the printing device by using the drive pulse and the drive interval.

3. A data transmission system, as claimed in claim 1, wherein either one of the pulse width data and the pulse interval data is an amount-exceeding pulse/interval data set, which contains data of an amount exceeding the predetermined amount, and the other one of the pulse width data and the pulse interval data is an amount-smaller pulse/interval data, which contains data of an amount smaller than the predetermined amount, and
   wherein the converting unit includes an embedding unit that produces one data segment based on a portion of one amount-exceeding pulse/interval data set, the embedding unit producing another data segment based on the entire portion of one amount-smaller pulse/interval data set, the embedding unit embedding a remaining portion of the amount-exceeding pulse/interval data set in an unused portion of the other data segment that includes the amount-smaller pulse/interval data set, thereby producing the two successive data segments.

4. A data transmission system, as claimed in claim 3, wherein the reception device includes a decoding unit receiving the two data segments transmitted from the transmission device, and decoding the two data segments into the original pulse width data and the original pulse interval data.

5. A data transmission system, as claimed in claim 4, wherein the decoding unit combines the portion of the amount-exceeding pulse/interval data set, which is contained in the one data segment, with the remaining portion of the amount-exceeding pulse/interval data set, which is embedded in the other data segment, thereby recovering the original amount-exceeding pulse/interval data set.

6. A data transmission system, as claimed in claim 5, wherein the embedding unit produces the one data segment based on at least one predetermined digit in the amount-exceeding pulse/interval data set, produces the other data segment based on all the at least one digit in the amount-smaller pulse/interval data set while remaining unused at least one digit position in the other data segment, and embeds at least one digit other than the predetermined digit in the amount-exceeding pulse/interval data set in the unused digit position in the other data segment.

7. A data transmission system, as claimed in claim 6, wherein the embedding unit embeds a portion of data at either one of a high-order end and a low-order end of the amount-exceeding pulse/interval data set in either one of a high-order end and a low-order end of the other data segment that contains the amount-smaller pulse/interval data set.

8. A data transmission system, as claimed in claim 1,
   wherein each pulse/interval data set indicates the corresponding length based on a predetermined first basic period of time,
   wherein the converting unit includes a reducing unit reducing the amount of an amount-exceeding pulse/interval data set, which contains data of an amount exceeding the predetermined amount, to produce one data segment of the predetermined amount, the reducing unit failing to reduce the data amount of an amount-non-exceeding pulse/interval data set, which contains data of an amount smaller than or equal to the predetermined amount, to produce another data segment of the predetermined amount,
   wherein the reception device includes a decoding unit decoding the data segment for the amount-non-exceeding pulse/interval data set based on the first basic period of time, thereby recovering the length indicated by the amount-non-exceeding pulse/interval data, the decoding unit decoding the data segment for the amount-exceeding pulse/interval data set based on the second basic period of time, thereby recovering the length indicated by the amount-exceeding pulse/interval data, each of the pulse width data and the pulse interval data being either one of the amount-exceeding pulse/interval data set and the amount-non-exceeding pulse/interval data set, the second basic period of time being longer than the first basic period of time by a length that corresponds to the data amount, by which the reducing unit has reduced from the original data amount of the amount-exceeding pulse/interval data set into the predetermined amount.

9. A data transmission system, as claimed in claim 8, wherein the decoding unit includes:
   a first pulse/interval generating unit decoding the data segment for the amount-non-exceeding pulse/interval data set to generate a product of the first basic time period and a value indicated by the data segment, and
   a second pulse/interval generating unit decoding the data segment for the amount-exceeding pulse/interval data set to generate a product of the second basic time period and a value indicated by the data segment.

10. A data transmission system, as claimed in claim 9, wherein each pulse/interval data set indicates a length integral number indicative of the corresponding length, the reducing unit reducing the amount of the amount-exceeding pulse/interval data set into the one data segment indicative of a reduced-length integral number indicative of a reduced length, the reducing unit failing to reduce the amount of the amount-non-exceeding pulse/interval data set into the other data segment indicative of a non-reduced-length integral number indicative of a non-reduced length,
   wherein the first pulse/interval generating unit decodes the data segment for the amount-non-exceeding data set to generate a length equal to an integral multiple of the first basic time period based on the non-reduced-length integral number and the first basic time period, and
   wherein the second pulse/interval generating unit decodes the data segment for the amount-exceeding data set to generate a length equal to an integral multiple of the second basic time period based on the reduced-length integral number and the second basic time period.

11. A data transmission system, as claimed in claim 8, wherein the decoding unit includes a decoder receiving a first basic clock signal defining the first basic time period and a second basic clock signal defining the second basic time period, the decoder decoding the data segment for the amount-non-exceeding pulse/interval data set by using the first basic clock signal, and decoding the data segment for the amount-exceeding pulse/interval data set by using the second basic clock signal.

12. A data transmission system, as claimed in claim 11, wherein the decoder includes:
   a first counting unit counting the first basic clock, the first counting unit counting the first basic clock to decode the data segment for the amount-non-exceeding pulse/interval data set based on the counted result; and
   a second counting unit counting the second basic clock, the second counting unit counting the second basic clock to decode the data segment for the amount-exceeding pulse/interval data set based on the counted result.

13. A data transmission system, as claimed in claim 12, wherein the first counting unit counts the first basic clock signal up to a value indicated by the data segment for the amount-non-exceeding pulse/interval data set, thereby decoding the data segment,
   wherein the second counting unit counts the second basic clock signal up to a value indicated by the data segment for the amount-exceeding pulse/interval data set, thereby decoding the data segment, and
   wherein after one of the first and second counting units completes counting a corresponding basic clock signal up to the value indicated by the corresponding data segment, the other one of the first and second counting units starts its counting operation.

14. A data transmission system, as claimed in claim 13, wherein the pulse width data is the amount-non-exceeding data and the pulse interval data is the amount-exceeding data,
   wherein the first counting unit counts the first basic clock signal to a value indicated by the data segment for the pulse width data, thereby decoding the data segment, and the second counting unit counts the second basic clock signal to a value indicated by the data segment for the pulse interval data, thereby decoding the data segment, the second counting unit starting its counting operation successively after the first counting unit completes counting the first basic clock signal to the value indicated by the data segment for the pulse width data.

15. A data transmission system, as claimed in claim 8, wherein the reducing unit includes a dividing unit that divides the amount-exceeding data set by a divisor of an amount that corresponds to the difference between the data amount of the amount-exceeding data set and the predetermined amount, and
   wherein the decoding unit includes a multiplying unit that multiplies the data segment for the amount-exceeding data set by a value equal to the divisor by setting the length of the second basic time period to a product of the first basic time period and a value equal to the divisor.

16. A data transmission system, as claimed in claim 15, wherein the dividing unit shifts, to the right, the amount-exceeding data set by at least one bit, whose number corresponds to the value of the divisor.

17. A data transmission system, as claimed in claim 16, wherein the dividing unit shifts, to the right, the amount-exceeding data set by one bit, thereby dividing the amount-exceeding data set in a half,
   wherein the multiplying unit sets the length of the second basic time period to a value twice as long as the first basic time period.

18. A data transmission system, as claimed in claim 8, wherein the reducing unit includes a subtracting unit that subtracts, from the amount-exceeding data set, a subtracting-value that corresponds to the difference between the data amount of the amount-exceeding data set and the predetermined amount, and
   wherein the decoding unit includes an adding unit that adds, to the data segment for the amount-exceeding data set, a value equal to the subtracting-value.

19. A data transmission system, comprising:
   a transmission device transmitting pulse-series information indicating a series of pulses, the series of pulses including a plurality of pulses which are separated from one another by at least one interval, the pulse-series information including: a plurality of sets of pulse width data indicating pulse width of the plurality of pulses, and at least one pulse interval data indicating length of the at least one interval, the transmission device including:

a converting unit receiving one set of pulse width data, indicative of one pulse, and one set of pulse interval data, indicative of one interval following or preceding the one pulse, either one of the pulse width data and the pulse interval data having data of an amount greater than a predetermined amount and the other one of the pulse width data and the pulse interval data having data of an amount smaller than the predetermined amount, the converting unit converting the one set of pulse width data and the one set of pulse interval data into successive data segments, each data segment including data of the predetermined amount, the converting unit performing the conversion operation by embedding a portion of the either one of the pulse width data and the pulse interval data, whose data amount exceeds the predetermined amount of one data segment, in an unused portion of another data segment that includes the other one of the pulse width data and the pulse interval data, thereby producing the successive data segments; and a transmission unit transmitting the data segments, each data segment containing data of the predetermined amount; and a reception device receiving the data segments from the transmission device and processing the data segments.

20. A data transmission system, as claimed in claim 19, wherein the reception device includes:
   a printing device;
   a decoding device decoding the received data segments into the original pulse width data and the original pulse interval data; and
   a driving device driving the printing device by using a drive pulse, whose pulse width is indicated by the pulse width data, and an interval, whose length is indicated by the pulse interval data, following or preceding the drive pulse.

21. A data transmission system, as claimed in claim 19, wherein the reception device includes:
   a reception unit receiving the successive data segments transmitted from the transmission device; and
   a decoding unit decoding the data segments into the original pulse width data and the original pulse interval data.

22. A data transmission system, as claimed in claim 21, wherein the decoding unit combines the portion of data in the either one of the pulse width data and the pulse interval data, which is embedded in the other data segment, with the remaining portion of data in the either one of the pulse width data and the pulse interval data, thereby recovering the original data of the either one of the pulse width data and the pulse interval data.

23. A data transmission system, as claimed in claim 22, wherein the converting unit embeds a portion of data at a predetermined digit location in either one of the pulse width data and the pulse interval data, whose data amount exceeds the predetermined amount for one data segment, in another predetermined digit location in the other data segment that includes the other one of the pulse width data and the pulse interval data, thereby converting the pulse width data and the pulse interval data into the successive data segments.

24. A data transmission system, as claimed in claim 23, wherein the converting unit embeds a portion of data at either one of a high-order end and a low-order end of the either one of the pulse width data and the pulse interval data, whose data amount exceeds the predetermined amount for one data segment, in either one of a high-order end and a low-order end of another data segment that includes the other one of the pulse width data and the pulse interval data, thereby converting the pulse width data and the pulse interval data into the successive data segments.

25. A data transmission system, comprising:
   a transmission device transmitting pulse-series information indicating a series of pulses, the series of pulses including a plurality of pulses which are separated from one another by at least one interval, the pulse-series information including: a plurality of sets of pulse width data indicating pulse width of the plurality of pulses based on a predetermined first basic period of time, and at least one pulse interval data indicating length of the at least one interval based on the predetermined first basic period of time,
   the transmission device including:
      a converting unit receiving one set of pulse width data, indicative of one pulse, and one set of pulse interval data, indicative of one interval following or preceding the one pulse,
   the converting unit converting the one set of pulse width data and the one set of pulse interval data into successive data segments, each data segment including data of the predetermined amount,
   the converting unit including a reducing unit reducing, when one of the pulse width data and the pulse interval data contains data of a data amount exceeding the predetermined amount, the data amount of the one of the pulse width data and the pulse interval data into a data amount, which is equal to or smaller than the predetermined amount and which corresponds to a second basic period of time longer than the first basic period of time; and
   a transmission unit transmitting the data segments; and
   a reception device receiving the data segments from the transmission device and processing the data segments,
   the reception device including a decoding unit decoding one data segment by using the first basic period of time, when the one data segment is for one of the pulse width data and the pulse interval data, whose data amount has been smaller than or equal to the predetermined amount, the decoding unit decoding one data segment by using the second basic period of time, when the one data segment is for one of the pulse width data and the pulse interval data, whose data amount has been reduced by the reducing unit.

26. A data transmission system, as claimed in claim 25, wherein the reception device further includes:
   a printing device; and
   a driving device driving the printing device by using a drive pulse, whose pulse width is indicated by the decoded pulse width data, and by using an interval, whose length is indicated by the decoded pulse interval data.

27. A data transmission system, as claimed in claim 25, wherein the decoding unit includes:
   an input unit receiving a first basic clock signal defining the first basic time period and a second basic clock signal defining the second basic time period; and
   a decoder decoding one data segment by using the first basic clock signal, when the one data segment includes data for one of the pulse width data and the pulse interval data, whose data amount has not been reduced, the decoder decoding one data segment by using the second basic clock signal, when the one data segment includes data for one of the pulse width data and the pulse interval data, whose data amount has been reduced.

28. A data transmission system, as claimed in claim 27, wherein the decoder includes:
a first counting unit counting the first basic clock;
a second counting unit counting the second basic clock, each of the first and second counting units starts counting successively after the other one of the first and second counting units has completed counting; and
a decoding portion decoding one data segment based on the counted result by the first counting unit, when the one data segment includes data for one of the pulse width data and pulse interval data, whose data amount has been smaller than or equal to the predetermined amount, the decoding portion decoding one data segment based on the counted result by the second counting unit, when the one data segment includes data for one of the pulse width data and pulse interval data, whose data amount has exceeded the predetermined amount.

29. A data transmission system, as claimed in claim 25, wherein the reducing unit includes a dividing unit that divides, when one of the pulse width data and the pulse interval data contains data of a data amount exceeding the predetermined amount, the one of the pulse width data and the pulse interval data by a divisor of an amount that corresponds to the difference between the data amount of the one of the pulse width data and the pulse interval data and the data amount equal to or smaller than the predetermined amount, and
wherein the decoding unit includes a multiplying unit that multiplies the data segment for the amount-divided data by a value equal to the divisor.

30. A data transmission system, comprising:
a transmission device, including:
a converting unit receiving a first set of data indicative of a first length of time and a second set of data indicative of a second length of time, the first set of data having data of an amount greater than a predetermined amount and the second set of data having data of an amount smaller than the predetermined amount, the converting unit producing a first data segment that includes a portion of the first set of data, the converting unit producing a second data segment that includes the second set of data and embedding a remaining portion of the first set of data in an unused portion of the second data segment, thereby converting the first and second sets of data into the first and second data segments, each of the first and second data segments including data of the predetermined amount; and
a transmission unit transmitting the first and second data segments; and
a reception device receiving the first and second data segments from the transmission device and processing the first and second data segments.

31. A data transmission system, as claimed in claim 30, wherein the reception device includes:
a reception unit receiving the first and second data segments transmitted from the transmission device; and
a decoding unit decoding the first and second data segments into the original first and second sets of data, the decoding unit combining the portion of the first set of data, which is included in the first data segment, with the remaining portion of the first set of data, which is embedded in the second data segment, thereby recovering the original first set of data.

32. A data transmission system, as claimed in claim 31, wherein the converting unit embeds a portion of data at either one of a high-order end and a low-order end of the first set of data into either one of a high-order end and a low-order end of the second data segment that includes the second set of data.

33. A data transmission system, comprising:
a transmission device, including:
a converting unit receiving a set of data indicative of a time length based on a predetermined first basic period of time, the converting unit converting the set of data into a data segment of a predetermined amount, the converting unit converting the data set into the data segment by reducing the data amount of the set of data into an amount smaller than or equal to the predetermined amount when the set of data contains data of an amount greater than the predetermined amount; and
a transmission unit transmitting the data segment; and
a reception device receiving the data segment from the transmission device, the reception device including a decoding unit,
the decoding unit decoding, when the converting unit has converted the original data set into the data segment without reducing the data amount, the data segment by using the first basic period of time, to produce data indicative of the original time length,
the decoding unit decoding, when the converting unit has converted the original data set into the data segment while reducing the data amount, the data segment by using a second basic period of time, to produce data indicative of the original time length,
the second basic period of time being longer than the first basic period of time by a length that corresponds to the data amount, by which the converting unit has reduced from the original data amount of the data set.

34. A data transmission system, as claimed in claim 33, wherein the decoding unit includes:
an input unit receiving a first basic clock signal defining the first basic time period and a second basic clock signal defining the second basic time period; and
a decoder decoding the data segment, when the converting unit has produced the data segment without reducing the data amount, by using the first basic clock signal, and decoding the data segment, when the converting unit has produced the data segment by reducing the data amount, by using the second basic clock signal.

35. A data transmission system, as claimed in claim 34, wherein the decoder includes:
a first counting unit counting the first basic clock;
a second counting unit counting the second basic clock; and
a decoding portion decoding the data segment, when the converting unit has produced the data segment without reducing the data amount, based on the counted result by the first counting unit, the decoding portion decoding the data segment, when the converting unit has produced the data segment by reducing the data amount, based on the counted result by the second counting unit.

36. A data transmission system, as claimed in claim 33, wherein the converting unit includes a dividing unit that divides, when the data set has the data amount greater than the predetermined amount, the data set by a divisor of an amount that enables the data amount of the data set to be reduced into a value equal to or smaller than the predetermined amount, and wherein the decoding unit includes a multiplying unit that multiplies, when the dividing unit has produced the data segment, the data segment by a value equal to the divisor, by setting the length of the second period of time to a product of the length of the first period of time and the value of the divisor.

37. A program storage medium, capable of being read by a computer, the program storage medium being for a data transmission system, the data transmission system including a transmission device transmitting pulse-series information, indicating a series of pulses, in the form of data segments, and a reception device receiving the data segments from the transmission device and processing the data segments, the series of pulses including a plurality of pulses which are separated from one another by at least one interval, the pulse-series information including: a plurality of sets of pulse width data indicating pulse width of the plurality of pulses, and at least one pulse interval data indicating length of the at least one interval, the program storage medium storing:

a converting program receiving one set of pulse width data, indicative of one pulse, and one set of pulse interval data, indicative of one interval following or preceding the one pulse, either one of the pulse width data and the pulse interval data having data of an amount greater than a predetermined amount and the other one of the pulse width data and the pulse interval data having data of an amount smaller than the predetermined amount, the converting program converting the one set of pulse width data and the one set of pulse interval data into successive data segments, each data segment including data of the predetermined amount, the converting program performing the conversion operation by embedding a portion of the either one of the pulse width data and the pulse interval data, whose data amount exceeds the predetermined amount of one data segment, in an unused portion of another data segment that includes the other one of the pulse width data and the pulse interval data, thereby producing the successive data segments; and a transmission program transmitting the data segments, each data segment containing data of the predetermined amount.

38. A program storage medium, capable of being read by a computer, the program storage medium being for a data transmission system, the data transmission system including a transmission device transmitting pulse-series information, indicating a series of pulses, in the form of data segments, and a reception device receiving the data segments from the transmission device and processing the data segments, the series of pulses including a plurality of pulses which are separated from one another by at least one interval, the pulse-series information including: a plurality of sets of pulse width data indicating pulse width of the plurality of pulses based on a predetermined first basic period of time, and at least one pulse interval data indicating length of the at least one interval based on the predetermined first basic period of time, the program storage medium storing:

a converting program receiving one set of pulse width data, indicative of one pulse, and one set of pulse interval data, indicative of one interval following or preceding the one pulse, the converting program converting the one set of pulse width data and the one set of pulse interval data into successive data segments, each data segment including data of the predetermined amount, the converting program including a reducing program reducing, when one of the pulse width data and the pulse interval data contains data of a data amount exceeding the predetermined amount, the data amount of the one of the pulse width data and the pulse interval data into a data amount, which is equal to or smaller than the predetermined amount and which corresponds to a second basic period of time longer than the first basic period of time; and a transmission program transmitting the data segments.

* * * * *